United States Patent [19]

Pomerene et al.

[11] Patent Number: 4,679,141
[45] Date of Patent: Jul. 7, 1987

[54] PAGEABLE BRANCH HISTORY TABLE

[75] Inventors: James H. Pomerene, Chappaqua, N.Y.; Thomas R. Puzak, Cary, N.C.; Rudolph N. Rechtschaffen, Scardsale; Philip L. Rosenfeld, Briarcliff Manor, both of N.Y.; Frank J. Sparacio, North Bergen, N.J.

[73] Assignee: International Business Machines Corporation, Armonk, N.Y.

[21] Appl. No.: 728,424

[22] Filed: Apr. 29, 1985

[51] Int. Cl.⁴ .............................................. G06F 9/00
[52] U.S. Cl. .................................................... 364/200
[58] Field of Search ... 364/200 MS File, 900 MS File

[56] References Cited

U.S. PATENT DOCUMENTS 4,370,711 1/1983 Smith .................................. 364/200
4,477,872 10/1984 Losq et al. .......................... 364/200

Primary Examiner—Raulfe B. Zache

Attorney, Agent, or Firm—Jack M. Arnold; Terry J. Ilardi

[57] ABSTRACT

A branch history table (BHT) is substantially improved by dividing it into two parts: an active area, and a backup area. The active area contains entries for a small number of branches which the processor can encounter in the near future and the backup area contains all other branch entries. Means are provided to bring entries from the backup area into the active area ahead of when the processor will use those entries. When entries are no longer needed they are removed from the active area and put into the backup area if not already there. New entries for the near future are brought in, so that the active area, though small, will almost always contain the branch information needed by the processor.

The small size of the active area allows it to be fast and to be optimally located in the processor layout. The backup area can be located outside the critical part of the layout and can therefore be made larger than would be practicable for a standard BHT.

7 Claims, 24 Drawing Figures

FIG. 2 INSTRUCTION FETCHING WITHOUT A BHT (BRANCHES INCLUDED)

INSTRUCTION FETCHING WITH A BHT

| 1 | 2 | 3 | 4 | | 5 |
|---|---|---|---|---|---|
| INSTR LOCATION | INSTR | TAKEN BRANCH | BRANCH TARGET ADDRESS | | QW INSTR LOCATION |
| 02DE28 | BAL | ✓ | 02E104 | | 02DE20 |
| 02E104 | ST | | | | 02E100 |
| 108 | TM | | | | " |
| 10C | BC | | | | " |
| 110 | TM | | | | 02E110 |
| 114 | BC | ✓ | 02E17A | | " |
| 02E17A | L | | | | 02E170 |
| 17E | LR | | | | " |
| 182 | LTR | | | | 02E180 |
| 184 | BC | ✓ | 02E1DE | | " |
| 02E1DE | TM | | | | 02E1D0 |
| 1E2 | BC | ✓ | 02E208 | | 02E1E0 |
| 02E208 | NI | | | | 02E200 |
| 20C | MVI | | | | " |
| 210 | LH | | | | 02E210 |
| 214 | N | | | | " |
| 218 | STH | | | | " |
| 21C | L | | | | " |
| 220 | L | | | | 02E220 |
| 224 | MVI | | | | " |
| 228 | TM | | | | " |
| 22C | BC | ✓ | 02E234 | | " |
| 02E234 | LH | | | | 02E230 |

FIG. 4

SAMPLE INSTRUCTION SEQUENCE

QW SEQUENCE OF THE SAMPLE

NS: NEXT SEQUENTIAL QW
QW: QUADWORD (16 BYTES)

FIG. 6 BHT, DIRECTORY AND ARRAY
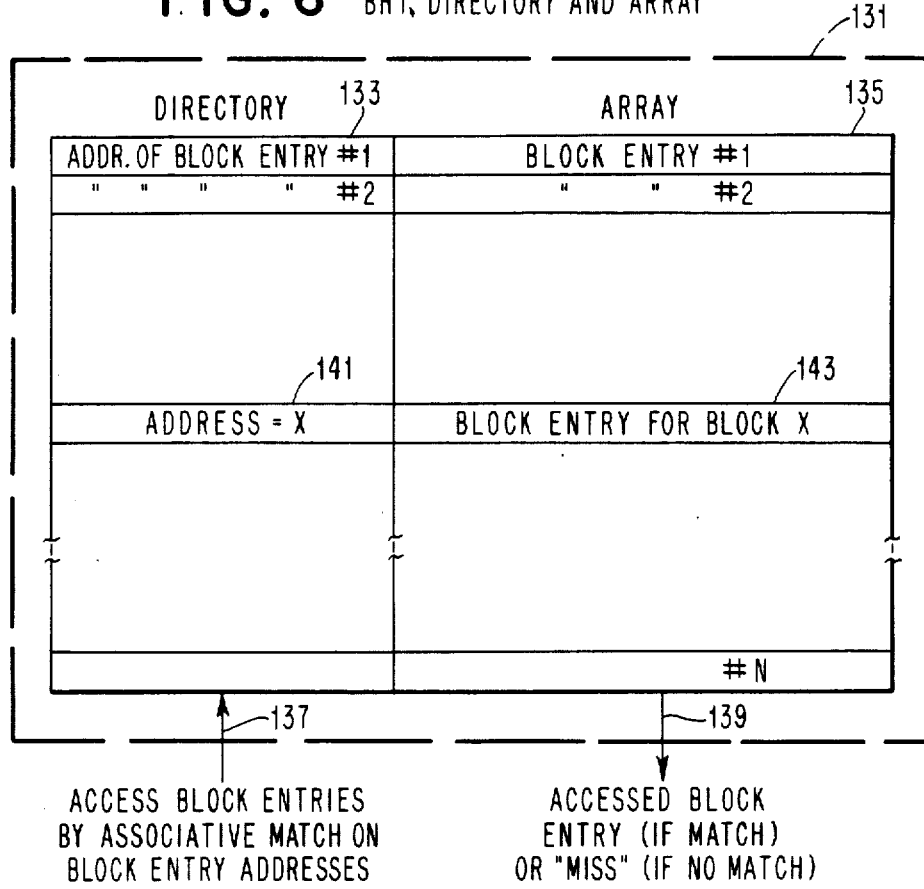
FIG. 7
BLOCK ENTRY FORMAT FOR BLOCK X
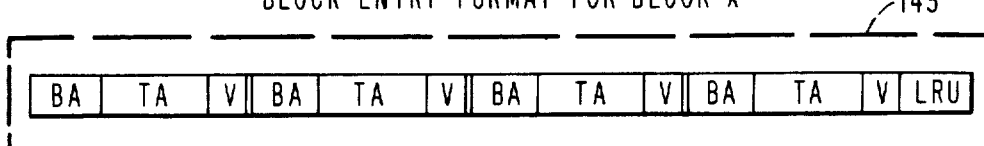
BA - BRANCH ADDRESS IN BLOCK (3 BITS IF BLOCK = QW)
TA - TARGET ADDRESS OF BRANCH   23 BITS
V  - VALIDITY BIT
LRU- USAGE BITS

QW SEQUENCE OF THE SAMPLE

NS: NEXT SEQUENTIAL QW
QW: QUADWORD (16 BYTES)

| BRANCH | DIRECTORY (BLOCK ADDR.) | BA₁ | TA₁ | BA₂ | TA₂ | TA₄ |
|---|---|---|---|---|---|---|
| 1 | 02DE2 / 02E10 | 8 | 02E104 | | | |
| 2 | 02E11 / 02E10 | 4 | 02E17A | | | |
| 2 | 02E11 / 02E17 | 4 | 02E17A | | | |
| 3 | 02E18 / 02E17 | 4 | 02E1DE | | | |
| 3 | 02E18 / 02E1D | 4 | 02E1DE | | | |
| 4 | 02E1E / 02E1D | 2 | 02E208 | | | |
| 4 | 02E1E / 02E20 | 2 | 02E208 | | | |
|  | 02E21 / 02E20 | | | | | |
| 5 | 02E21 / 02E22 | C | 02E234 | | | |

FIG. 14

SUCCESSIVE CONTENTS OF AN
ACTIVE AREA OF TWO BLOCKS

BACKUP AREA

THE SAMPLE PROGRAM HANDLED IN 64 BYTE SEGMENTS
SEGMENT = 4 BLOCKS, BLOCK = 16 BYTES

ACTIVE AREA AND ACTIVE AREA DIRECTORY

SEGMENT ENTRY FORMAT FOR SEGMENT X

BA - BRANCH ADDRESS IN SEGMENT (5 BITS IF SEGMENT = 64 BYTES)
TA - TARGET ADDRESS OF BRANCH   23 BITS
V  - VALIDITY BIT
LRU- USAGE BITS

BRANCH ACTION WITHIN SEGMENT

SEGMENT ENTRY/SEGMENT EXIT TABLE

| SEGMENT ENTRY REGION | SEGMENT EXIT |
|---|---|
| P | NEXT SEQUENTIAL SEGMENT |
| Q | SEGMENT A |
| R | NEXT SEQUENTIAL SEGMENT |
| S | SEGMENT B |
| T | NEXT SEQUENTIAL SEGMENT |

EXIT ANALYSIS IS DONE IN TWO PHASES

PHASE 1: THE REGIONS DELIMITED BY (BA) WITH AN EXTERNAL TARGET ADDRESS (TA) ARE GIVEN THAT (TA) AS THE EXIT FROM THAT REGION. THE REGION BETWEEN THE HIGHEST (BA) AND THE SEGMENT BOUNDARY IS GIVEN NSS (FIRST HN OF THE NEXT SEQUENTIAL SEGMENT) AS ITS EXIT ADDRESS.

PHASE 2: RESOLVING THE INTERNAL BRANCHES TO THEIR EVENTUAL EXIT BY FOLLOWING THE (TA) OF THE REGION UNTIL ONE WITH AN ASSOCIATED EXIT IS FOUND OR UNTIL A CYCLE IS DETECTED. THE FLOWCHART FOR PHASE 2 IS SHOWN ON FIG.23.

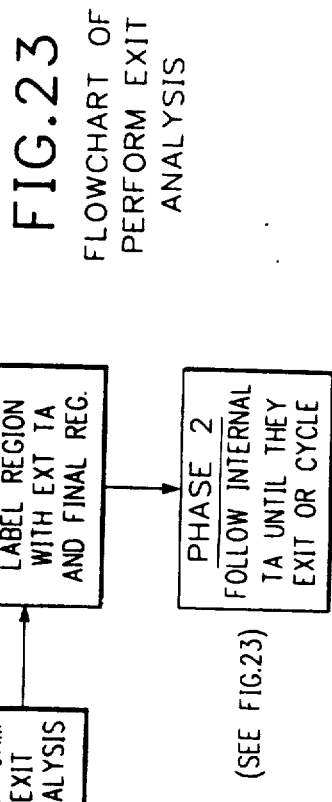

FIG.23

FLOWCHART OF PERFORM EXIT ANALYSIS

PAGEABLE BRANCH HISTORY TABLE

TECHNICAL FIELD

The invention is in the field of data processing, and specifically is directed to the processing of branch instructions in a computing machine.

BACKGROUND ART

In high performance processors it is common practice to decompose an instruction into several steps each performed by different step-processing units. Each such unit can have the capability of accepting a specific step for successive instructions every cycle. It is common practice to thereby overlap the successive steps in executing an instruction on a cycle by cycle basis with each following instruction with a one cycle offset. Ideally, this allows one instruction to be handled each cycle even though any given instruction takes several cycles to complete.

This ideal overlap is not always possible for several reasons. A major reason is the frequent occurrence of branch instructions. These have two significant attributes: the branch may or may not be taken, introducing a temporary uncertainty as to which of two instructions is next; and if it is taken, the next instruction must be obtained from an address usually specified in the branch.

A number of patents are directed to branch prediction mechanisms, each having certain advantages and disadvantages. For example, U.S. Pat. No. 4,370,711 to Smith discloses a branch predictor for predicting in advance the result of a conditional branch instruction in a computer system. The principle upon which the system is based is that a conditional branch instruction is likely to be decided in the same way as the instructions most recent executions.

U.S. Pat. No. 4,251,864 to Kindell et al, discloses a branch predictor for manipulation of signal groups having boundaries not coinciding with boundaries of signal group storage space. When a word containing an operand boundary is transferred to the central processing unit, non-operand data is also transferred with the word. The non-operand data occurring in the boundary word is removed from the operand signal group and stored in the central processing unit. After manipulation of the operand by the central processing unit, the non-operand data is reinserted in the boundary words in the signal position previously occupied and the word group containing the manipulation or the resulting operand is stored in the memory location from which it was originally removed.

U.S. Pat. No. 3,800,291 to Cocke et al, is a branch prediction mechanism in which branch instructions may branch to the address of the information on the same or on another page. The branch instruction includes an indicator as to whether the branch address is a physical address on the same or another page, or a virtual address on another page.

U.S. Pat. No. 4,181,942 to Forster et al, discloses a program branching method and apparatus in which a special branch instruction used in a computing system serves as a conditional branch or as a non-conditional branch as determined by the state of an internal register. This special branch instruction is used for conditional branching within or at the end of a program loop and for unconditional branching outside of such a loop.

U.S. Pat. No. 3,325,785 to Stephens, sets forth a branch prediction mechanism which efficiently utilizes control storage and its access controls. A simple strategy for handling branches is to suspend overlap until the branch is fully completed: resolved as taken or not taken and if taken, the target instruction is fetched from memory. However, this strategy results in several cycles per branch which are lost from the ideal overlap. Another strategy is to make a fixed choice based on the type of branch and statistical experience as to whether the branch will be taken. When the choice indicates not taken normal overlap is continued on a conditional basis pending the actual outcome. If the choice proves wrong the conditionally initiated instructions are abandoned and the target instruction is fetched. The cycles devoted to the conditional instructions are lost as well as the cycles to fetch the target. However, the latter is often avoided by prefetching the target at the time the branch is decoded.

A more effective strategy is embodied in U.S. Pat. No. 3,559,183 to Sussenguth, which patent is assigned to the assignee of the present invention. It is based on the observation that most branches, considered individually, are consistently either taken or not taken and if taken, will have a consistent target address. In this strategy a table of taken branches is constructed. Each entry in the table consists of the address of the taken branch followed by the target address of the branch. This table is a hardware construct and so it has a predetermined size, typically from 1024 and 4096 entries. Entries are made only for taken branches as they are encountered. When the table is full making a new entry requires displacing an older entry. This can be accomplished by a Least Recently Used (LRU) basis as in caches.

In principle, each branch in the stream of instructions being executed is looked up in the table, by its address, and if it is found, its target is fetched and becomes the next instruction in the stream. If the branch is not in the table it is presumed not taken. All actions based on the table are checked as instruction execution proceeds. If the table is found to be wrong corrections are made. If the branch predicted to be taken is not taken, the table entry is deleted. If a branch predicted not taken is taken a new entry is made for it. If the predicted target address is wrong the corrected address is entered.

In practice, the foregoing is modified slightly. It is desirable to find taken branches early enough so that the target can be fetched before or at least as soon as it is needed, so that no delay will occur in the pipeline. This condition is usually not met if the table is accessed only after a branch is located and identified. Therefore, the table is usually organized and addressed on the basis of the instruction fetching packet of the machine. Currently, this packet is a double word (DW). The practical procedure is then as follows. When the machine fetches a double word into its instruction buffer, the DW address is also supplied to the table. If an entry exists the target (DW) is fetched as soon as cache priority permits. In turn, this target DW is supplied to the table, continuing the process.

The prior art described above is called a Branch History Table (BHT) and handles a great majority of branches successfully but there is a several cycle penalty when it is wrong. For practical sizes of the table (say 256 entries or approximately 2K bytes) this penalty almost offsets the gain from its use. Although a larger table (4K entries or approximately 32K bytes) would reduce the percentage of wrong predictions, hence the penalty, the problem is that the table hardware must be packaged in the speed critical instruction fetch and preparation area of the machine. It would be important to reduce rather than increase the table hardware in this area, because the more hardware that must be put in the area the longer the wiring distances and the greater the number of logic delays which must be reckoned in the critical paths determining the cycle time. These would, of course, lengthen the cycle time and a longer cycle time works constantly to decrease machine speed. Few organizational improvements, the BHT included, are good enough to offset much of an increase in cycle time which they may cause. We seek, therefore, improvements which will not place more hardware in the critical area.

According to the present invention, a Pageable Branch History Table (PBHT) is described, which does not add hardware to the critical area and in fact reduces it. A superficial analogy can be drawn to the relation between a cache memory and main memory. Let the full BHT be held in main memory (as it would be) and let the PBHT be the cache. Only the small cache (PBHT) must be in the speed critical area, the main memory (full BHT) can be elsewhere. Note, importantly, that the full BHT is no longer limited in size by hardware or cycle time considerations. It can be as large as provides a useful advantage.

However, there are two things which distinguish the PBHT from the superficial cache analogy. First, the contents of the PBHT are not based on recency of past reference, as with a cache, but on a relative certainty of future use. The PBHT control mechanism utilizes the information maintained within the larger BHT concerning branch action to fetch the relevant information about future branches on a timely basis. The processor requires fast access only to those branches which are in close (logical) proximity to the current instruction being processed. This represents only a small fraction of all the branching information contained in the full BHT. The full BHT is required because its ability to maintain information about many branches assures its high accuracy. The PBHT is managed with this information to provide a fast access to the small subset which is immediately relevant.

The second aspect of the PBHT which distinguishes it from a cache is the manner of its autonomous control. Unlike a cache which is driven only by processor activity and maintains its relevance based on pure chance, the PBHT actively manages its contents independently of the processor and assures its relevance. The PBHT maintains its own relevance by constantly fetching into itself the next branches which the processor can encounter.

BRIEF DESCRIPTION OF THE DRAWINGS

FIG. 4 is a diagram of a sample instruction sequence;

FIG. 6 is a diagram of a BHT directory and a BHT array;

FIG. 7 is a diagram of a block entry format;

FIG. 14 is a diagram illustrating the successive contents of an active area comprised of 2 blocks;

FIGS. 23 and 24 are flow chart of the analyzer.

DISCLOSURE OF THE INVENTION

A branch history table is divided into two sections, with the branch history table viewing memory as being divided into segments, with a segment being a continuous portion of memory beginning on a segment boundary. A first active high speed section stores n segments of instructions, while a second slow speed section stores the remaining segments in the table. An analyzer determines the exit address of each branch instruction in a segment, and a stager responds to the exit address determinations of the analyzer to assure the next (n−1) segment crossings will be in segments stored in the first active high speed section.

BEST MODE FOR CARRYING OUT THE INVENTION

Figure 1:
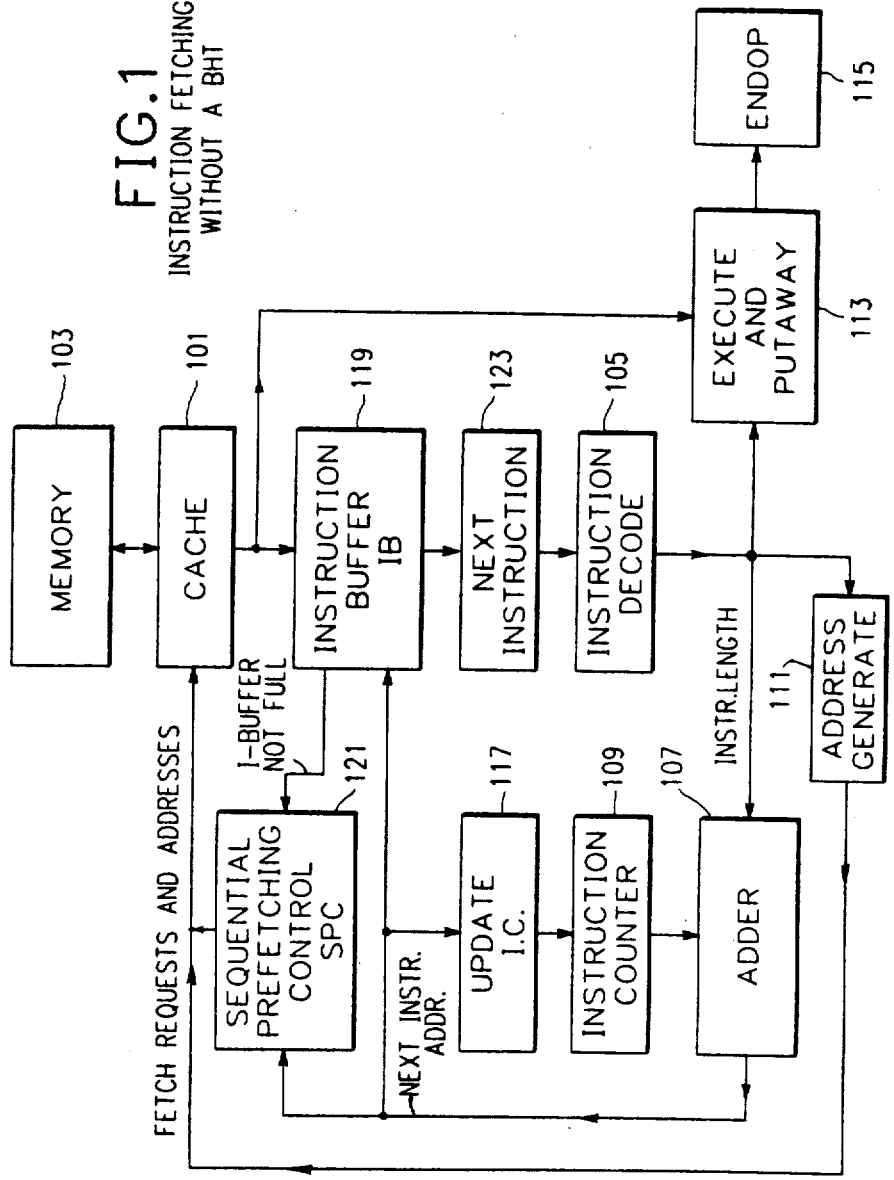
FIG. 1 is a block diagram of an instruction fetching mechanism.

The operation of a standard Branch History Table (BHT) is explained as a prelude to explaining the operation of a Pageable Branch History Table (PHBT) according to the present invention. First, a description is set forth relative to how instructions are fetched in a typical high performance processor without a BHT, and then instruction fetching with a BHT is described. The BHT structure and operation is then described in more detail. FIG. 1 shows the essential features of a typical high performance processor that does not have a BHT. For explanatory purposes, the diagram emphasizes the instruction portion and de-emphasizes or omits many other features that would be needed in a complete processor design.

It is assumed that the data and instructions for the processor are stored in a cache 101 backed up in the usual way by a main memory 103. For purposes of description, consider an instruction which has just been placed in the Instruction Decode register 105, with events being traced forward in time from that point.

As soon as a new instruction appears in the decode register 105 three actions are begun in parallel. The first action is to send the instruction length information (the two leftmost bits of the instruction in IBM S/370 architecture) to an adder 107 where it is added to the current value in an Instruction Counter 109. The current value at this moment is the address of the instruction in the decode register 105. This first action, which is of main interest, will be returned to after briefly describing the other actions.

The second action is to send the operand address information of the instruction (if any) to an Address Generate mechanism 111 where an address is formed and sent as a fetch request to the cache 101. All the steps of generating an IBM S/370 address are not shown since they are not needed for this explanation. Note that the fetch request to the cache can be either for data or another instruction. For the present, assume that the fetch is for data.

The third action is to send the execution information from the instruction to the Execute and Putaway mechanism 113 where it will be held until any needed data (requested by the Address Generate mechanism 111) is returned from the cache 101 to the Execute and Putaway mechanism 113. When the needed data is available, execution of the instruction is completed and the results put away as required by the particular instruction. Finally, an Endop function or signal 115 is issued to mark the point in time when the instruction is successfully completed.

Now return to the first action. The output of an adder 107 is the address of the next instruction after the one currently being decoded in the decode register 105. This next instruction address is sent to the Update Instruction Counter register 117, the Instruction Buffer (IB) 119, and the Sequential Prefetching Control (SPC) 121. The function of the SPC is to keep the IB always loaded with the next N instructions in sequence following the one currently being decoded. (Typical values for N are 4, 6, or 8). The function of the IB is to hold these N instructions and to provide them on request quickly to the instruction decode area. This request is made by the Next Instruction address and the selected next instruction is read from the IB to the Next Instruction register 123. When the Instruction Decode register 105 is ready for the next instruction, the next instruction is gated in from register 123. At the same time the updated instruction counter value is gated from register 117 into the Instruction Counter 109. The foregoing sequence then is repeated for the new instruction.

As instructions are withdrawn from the IB, space for further instructions become available. This availability of space is signalled by the "I Buffer Not Full" issuing from the IB 119 to the SPC 121 When this signal is present the SPC requests from the cache 101 the next sequential instruction or instructions (depending upon the size of the IB entries) beyond the last ones requested.

Figure 2:
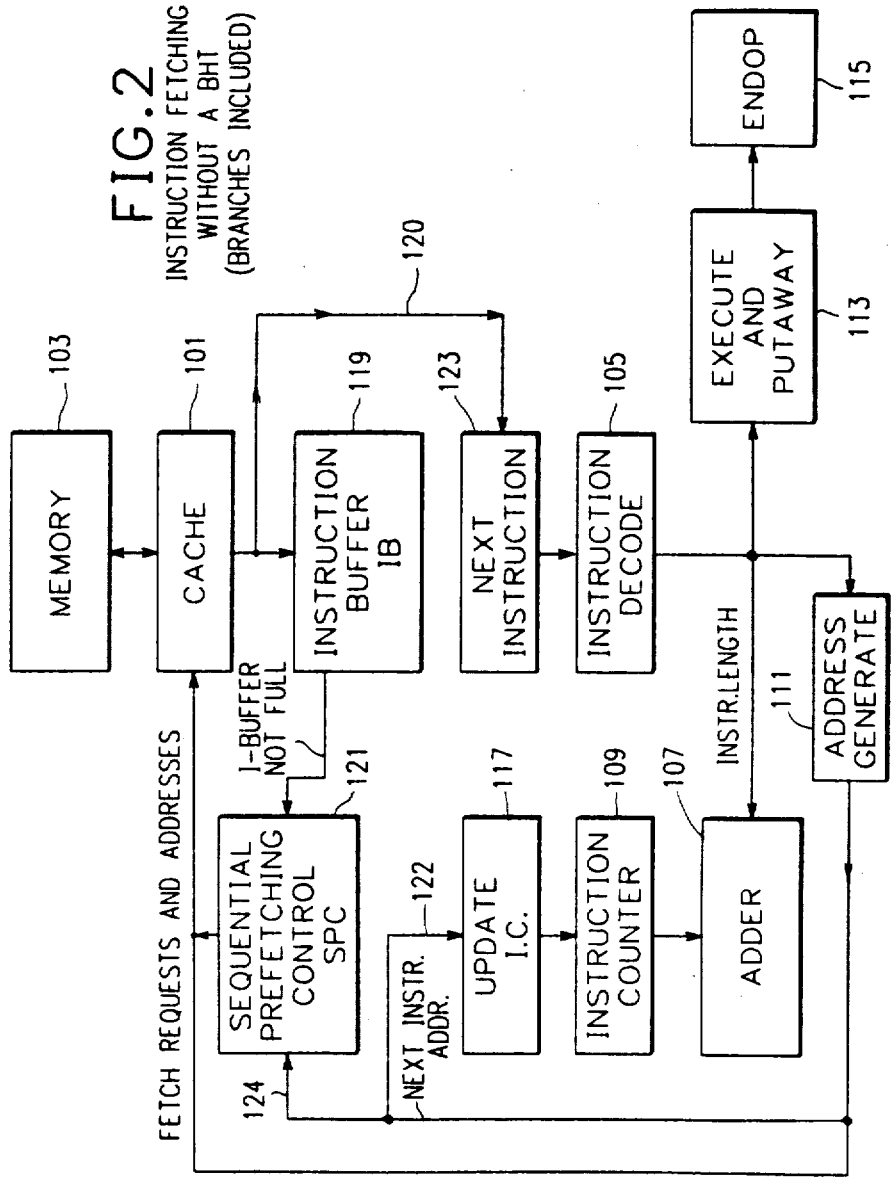
FIG. 2 is a block diagram of an instruction fetching mechanism, including branch instruction prefetching.

The description so far has not, for simplicity, included the effect of Branch instructions. Assume now that the instruction currently being decoded in the decode register 105 is a branch instruction, and that the branch is to be taken. In this case the address formed by the address generate mechanism 111 is the branch target address. The branch target (which is an instruction) is fetched from the cache 101 and the target instruction is loaded from the cache into the Next Instruction register 123. The path taken is shown by a heavy line 120 in FIG. 2. The target address is also sent to the Update IC register 117, and the SPC 121 as shown by heavy lines 122 and 124, respectively. These are the appropriate actions when the branch is known to be taken. For conditional branches the take/not take decision could go either way and it is common practice to provide two Next Instruction and two Update IC registers so that both the branch target and the next sequential instructions are ready for selection when the take/not take decision is subsequently made. If the branch is taken, the SPC 121 proceeds to load the IB 119 with the next sequential instructions following the branch target. Any prefetched instructions down the not taken path which are in the IB may voided or not, depending on the buffer management rules.

When a Branch History Table is used to control instruction fetching, the BHT assumes the role of the Sequential Prefetching Control previously described. This can be seen by comparing FIG. 3 with FIG. 2. The two figures are identical except that in FIG. 3 the BHT 125 replaces the SPC 121, two signal paths have been added, and one deleted.

Figure 3:
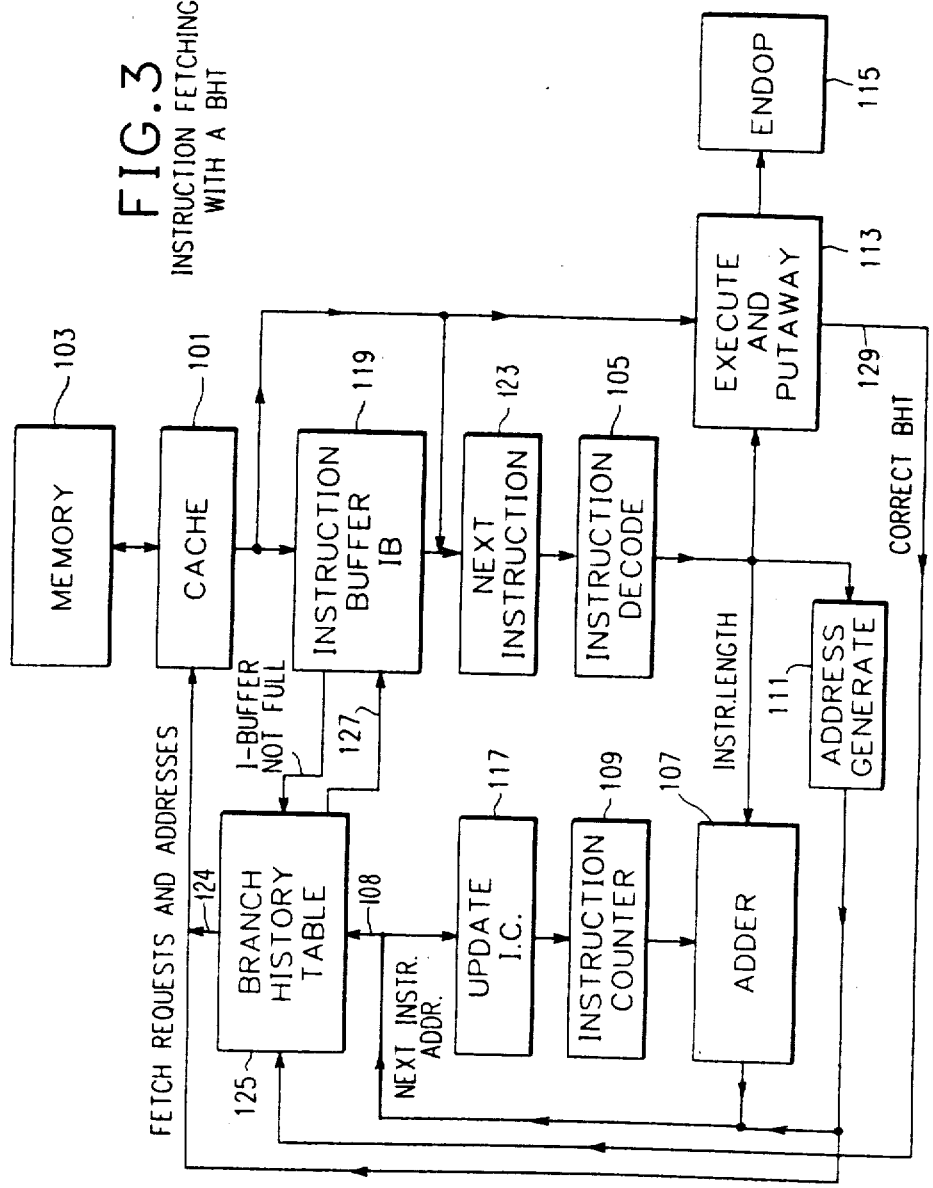
FIG. 3 is a block diagram of an instruction fetching mechanism including a branch history table (BHT)

A general description of the operation of the BHT is now set forth, with a more detailed description following. Essentially, the BHT does a more complete job of instruction prefetching than does the SPC, because it handles not only next-sequential prefetching but also prefetches the targets of most taken branches. This is a two step process. Referring to FIG. 3, the BHT 125 must issue the appropriate succession of next-sequential and branch target fetches to the cache 101 so as to load the IB 119 with the instructions that will be needed by the processor in the near future. This is similar to the role of the SPC 121 (FIG. 1) except that it includes branch target fetches as well as next sequential.

Second, the BHT 125 must command the IB via path 127 to load the Next Instruction register 123 with the appropriate next instruction, whether next-sequential or branch target, so that the processing of instructions can proceed smoothly and without loss of time.

Although it is quite accurate, the BHT 125 can make a wrong decision from time to time. The wrong decision is usually detected in the Execute and Putaway mechanism 113 and the necessary correction is signalled on path 129 to the BHT 125.

The structure and operation of a BHT is now described. It should be noted that there are many designs for a BHT. The one presented here is chosen for simplicity of exposition rather than optimality of design. For example, the fully associative directories are assumed rather than the more common set-associative ones which would probably be used in an actual implementation.

As mentioned before, the purpose of the BHT 125 is to fetch instructions from the cache in advance of when they are needed and to have them ready for decoding without delay. Although instructions could be fetched individually, it is usually desirable to get several instructions per fetch so as to leave more cache accesses available for operands. The group of instructions obtained in one fetch is termed a "block". In current practice a block is typically a double word (DW—8 Bytes) but in future machines a quadword (QW—16 Bytes) is more likely.

The block concept will now be explained in more detail in relation to FIG. 4 which shows a typical sequence of instructions, including a number of branches. Column 1 gives the memory address (in hexadecimal)

where each instruction resides. Column 2 gives the instruction mnemonic. Column 3 indicates with a check mark which branches are taken while column 4 gives the corresponding target address. This target address is the address of the next instruction to be executed after the taken branch, as can be seen by comparing each entry in column 4 with the entry one line down in column 1. Finally, column 5 gives the quadword location of each instruction. The QW will be used as the block size from here on.

Figure 5:
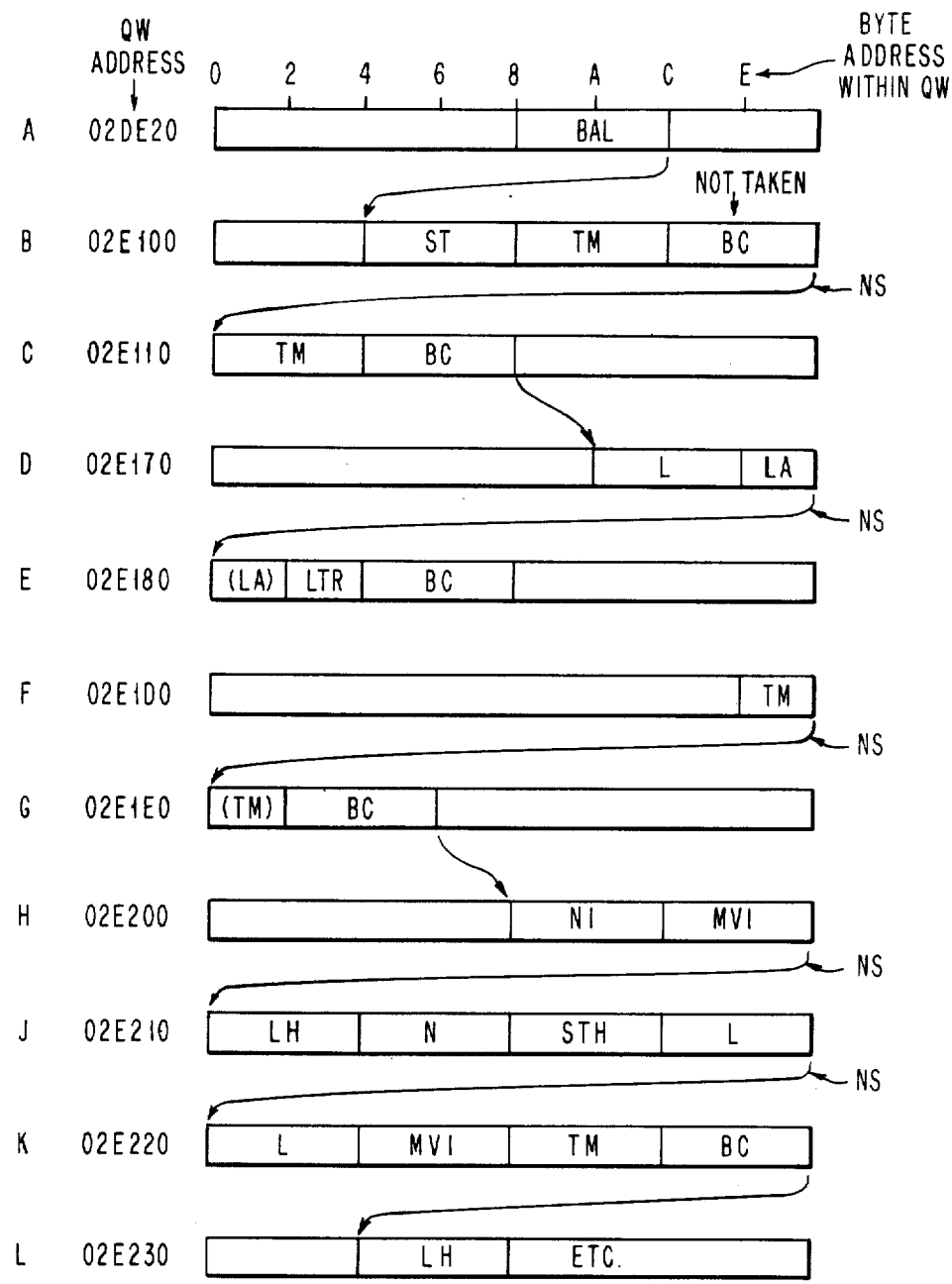
FIG. 5 is a diagram of a quadword sequence.

FIG. 5 shows the same sequence of instructions properly located within their respective QW blocks. Note that the transition from one block to another occurs in two ways. Starting from the top, the first transition is caused by a branch (BAL) and the second transition is to the next sequential (NS) block. The third transition is caused by a branch (BC) and the fourth is again a next sequential. Note that an instruction, e.g., LA, can be partly in one block and partly in the next.

FIG. 5 also illustrates the concept of the block sequence. It shows the actual block sequence needed for executing the sample instructions of FIG. 4. In a processor without a BHT, this sequence is determined, block by block, as the processor encounters each taken branch. Since the sequence is not known in advance, the processor will usually be delayed after each taken branch while the next block is fetched from the cache.

In a processor with a BHT, the job of the BHT is to predict the block sequence in advance so that the needed blocks can be fetched in advance and processor delay avoided. Still referring to FIG. 5, a sequence is started by fetching block A and at the same time accessing the BHT with the (QW) address of A. There is a taken branch in block A, and so there should be an entry in the BHT for block A. This entry will contain the location of the branch (Byte address=8) and the target address of the branch. Block B contains this target address so block B is fetched and at the same time the BHT is accessed with the address of B. There is no taken branch in B so there is no entry for B in the BHT. Instead, the BHT returns a "miss" indication. The miss indicates that the next block C should be the next sequential one after B, as it is. Block C is then fetched and the BHT interrogated. There is a taken branch in C and so the BHT will return its location target address, which is used to fetch block D, etc.

The process can, in principle, be continued indefinitely, getting farther and farther ahead of the block which the processor is currently executing. Two practical considerations will set a limit: first, the size of the instruction buffer 119 (see FIG. 3) and second, the increasing probability that some branch in the chain of blocks will be incorrectly predicted by the BHT, in which case all further block prefetching beyond the branch will be incorrect and useless.

The description so far has been slightly incomplete in order to emphasize the block sequence concept. The omitted detail is the need to identify the target byte address within each block which is the target of a taken branch. For quadword blocks the target byte address is the low order 4 bits of the branch target address. FIG. 5 shows arrows pointing to the target byte addresses. Of course NS transitions always start with byte 0 of the next sequential block.

The target byte is needed by the BHT because there can be more than one taken branch in a block. For example, in block D there could be a taken branch to the left of the indicated entry point. This possible taken branch, not shown in FIG. 5, is not included in the sample instruction sequence but is part of some other instruction sequence that the processor may have encountered previously. Therefore, the BHT may have a valid entry for it. The BHT must use the target byte address, indicating the block entry point, to select the first taken branch after the entry point. In this example, there is no such branch in block D, the next taken branch is in block E.

The target byte address is also needed by the processor in order to select the correct next instruction, after a taken branch, to be moved from the instruction buffer 119 into the Next Instruction register 123, FIG. 3.

A general description of a BHT has been set forth. Next, a specific hardware embodiment of a BHT is chosen which provides the described functions. An embodiment is chosen which is a little different from most implementations, but which provides a better foundation for a subsequent explanation of the Pageable BHT.

FIG. 6 shows the BHT directory 133 and the BHT array 135. Note that the array entries are on a block basis, where a block is the group of instructions obtained from memory per fetch. Only blocks containing taken branches will have entries in the array. The address of a block entry is the address of its associated block, these addresses are contained in the associative directory 133. The BHT directory/array 131 is accessed with a block address via path 137 and the access address is compared with all addresses in the directory. There will be at most one match and the block entry with the matching address will be read out of the array 135 on path 139. If there is no match, a "miss" will be signalled on path 139.

The operation of the directory/array 131 is very much like a cache except that the block entries in the array are not blocks of instructions, but rather contain information on taken branches which may be in the blocks of instructions. Consider the entry for any block X. It will have an address value equal to X, 141 in FIG. 6, and a corresponding block entry 143.

FIG. 7 shows the block entry format. Since there can be more than one taken branch in a block of size greater than 2 bytes there is provision in the format for information on more than one taken branch. Four is a more than adequate allowance for the QW block size currently being discussed. Each branch sub-entry consists of a branch address (BA), its target address (TA), and a bit to indicate a valid sub-entry (V). Since the block address of the branch is known to be X, the BA need only indicate the position within the block, which takes 3 bits for a QW block, (instructions can only be on halfword boundaries in 370 architecture). TA must be a full instruction address since the target can be in any block. However, it is noted that for block sizes larger than a QW there is a good change that the target will be within the same block, in which case, the TA could be abbreviated in an actual design.

The validity bit is needed because a given block may have fewer than four taken branches, in which case one or more sub-entries will have no valid information. The usage bits are needed because a given block may have more than four taken branches. Suppose that all four sub-entries are valid and a fifth taken branch for the same block is to be entered. One of the existing sub-entries must be deleted to make room for the new sub-entry. The usage bits show which existing sub-entry was least recently used and is therefore the best candidate for replacement.

From the above, enough information has been accumulated to build the basic BHT, which will be done in a step by step fashion in order to clarify the flow of events.

Figure 8:
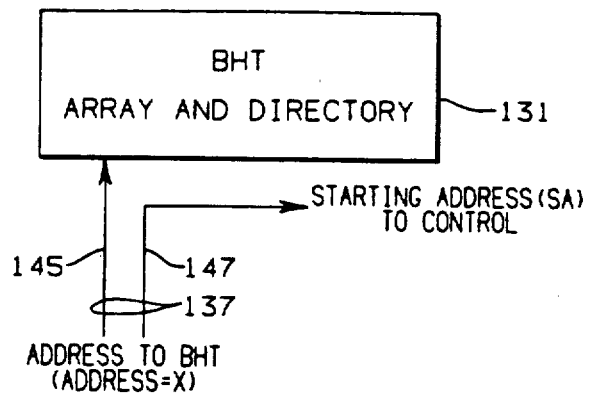
FIG. 8 is a diagram of the start of an access to a BHT array/directory.

FIG. 8 shows the start of an access to the BHT array/directory 131. A full instruction address (X) is supplied on path 137 which is shown as split into two parts 145 and 147. Part 145 is the portion of the full address which specifies the block entry to be accessed. Part 147 specifies the starting location within the block and is not immediately needed, it will be used later.

Figure 9:
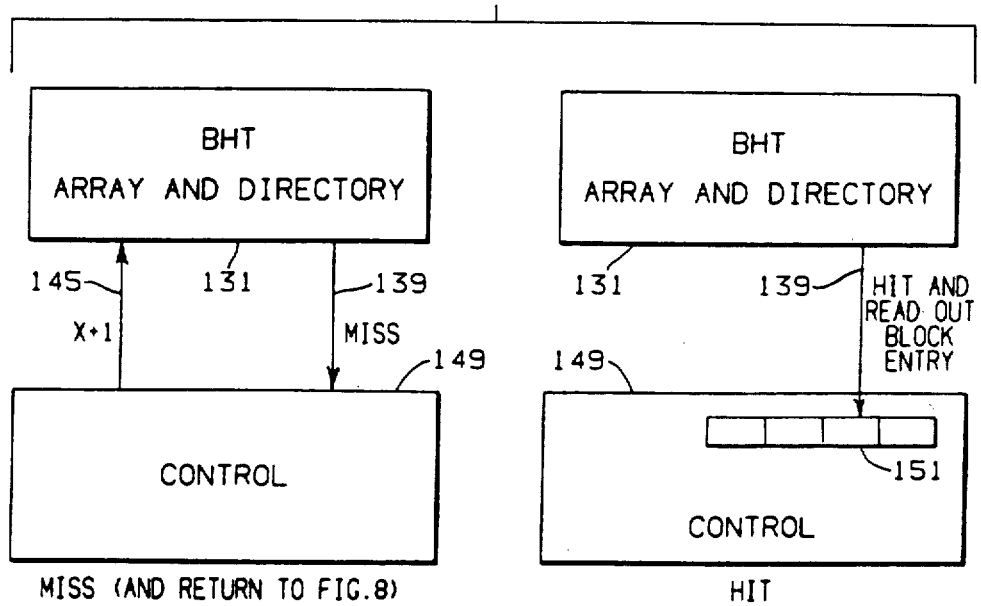
FIG. 9 is a diagram of the completion of a BHT array access for either a "hit" or a "miss"

In FIG. 9 the BHT array access is complete and results in either a "miss" or a "hit", both reported on path 139. If a "miss" it is assumed no taken branch is in this block and the control 149 initiates on path 145 an access with the next sequential block address X+1, returning to the situation of FIG. 8. If a "hit" the selected block entry is sent to control 149 and temporarily held in register 151.

Figure 10:
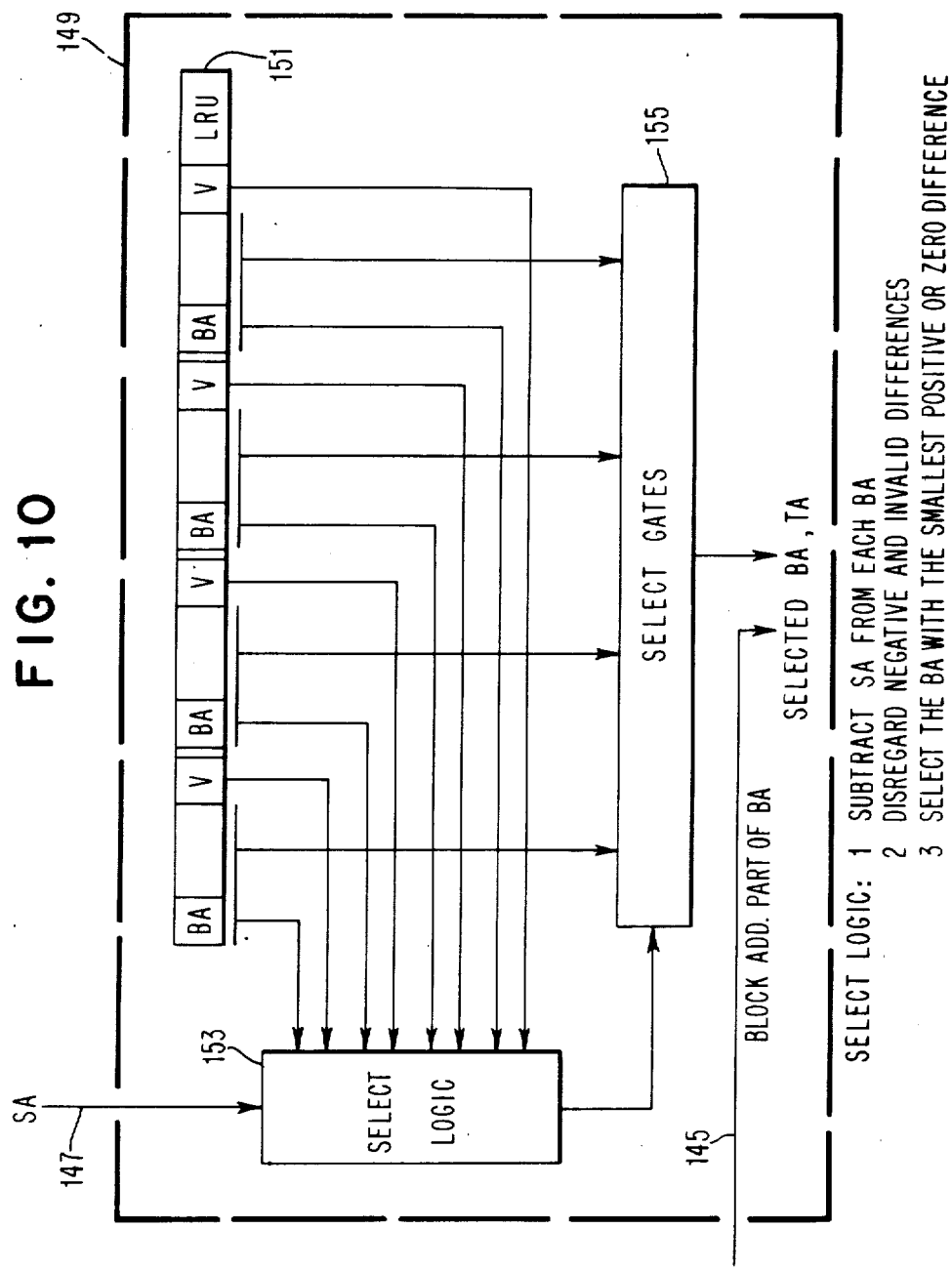
FIG. 10 is a detailed block diagram of the control block 149 which is shown generally in FIG. 9.

FIG. 10 shows part of the control 149 in more detail and specifically it shows how the correct sub-entry is selected from the block entry in register 151. What is desired is the sub-entry for the first taken branch which will be encountered after the starting location within this block. The selection is accomplished by the select logic 153 according to the stated rules.

The selected BA/TA pair is gated out by the select gates 155. Note that the full BA is provided by appending the block address from path 145. The selected BA/TA pair goes to three places. First, the TA (Target Address) part is used to initiate a new block fetch and BHT access (if the I-Buffer is not full); second, the TA resets the next sequential controls; and third, the BA and TA must be saved within the BHT controls to guide the later selection of next instructions from the I-Buffer 119 into the Next Instruction register 133, (FIG. 3).

Figure 11:
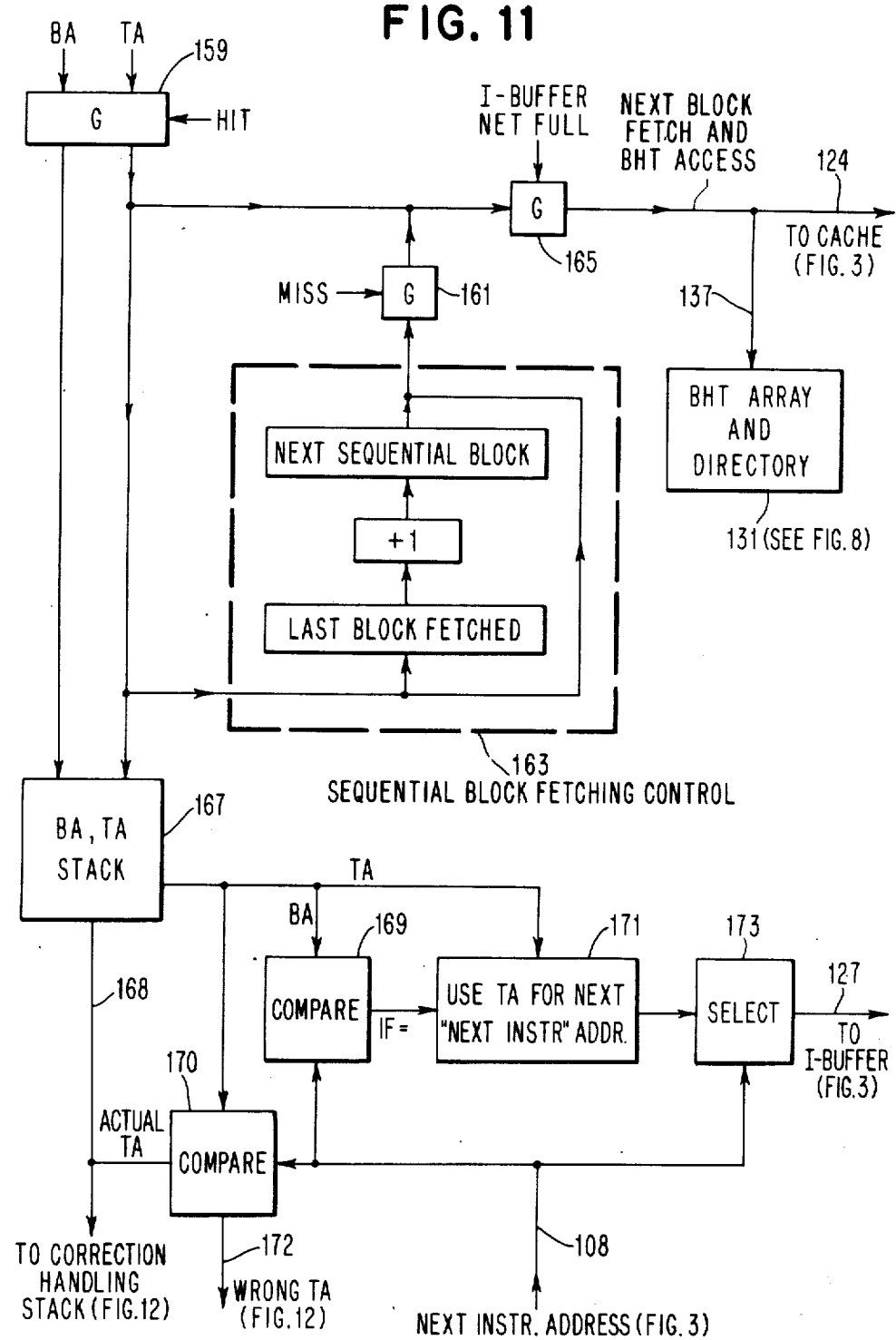
FIG. 11 is a block diagram illustrating the fetching mechanism according to the present invention.

FIG. 11 shows these actions in more detail. The selected BA/TA pair from FIG. 10 is applied to the gate 159 which is activated by the BHT "hit". The TA output from gate 159 goes to gate 165 and if the I-Buffer is not full, causes a next-block fetch and a new BHT access using TA as the block address. The TA output also goes to the sequential block fetching control 163 and is entered into the Last Block Fetched register so that the next sequential block, if called for, will be TA+1. The next sequential block is called for when the BHT has a "miss" via gate 161.

The BA and TA outputs from gate 159 are also entered into a stack 167 to guide the pre-loading of instructions from the I-Buffer to the Next Instruction register. The BA part of the oldest entry in the stack is compared to the Next Instruction Address 108 (FIG. 3). If the compare 169 shows "equal", i.e., the next instruction address is BA, then the next Next Instruction Address should be TA. The function 171 holds TA for this purpose and signals select unit 173 to issue the current Next Instruction Address on path 127 to the I-Buffer and also to issue TA as the next Next Instruction Address. The BA/TA pair is then removed from stack 167 and the process continues with the next oldest pair.

The effect of the foregoing can be seen by referring to FIG. 3. Suppose the instruction in the decode register 105 is just before a taken branch which has the oldest entry in the BA/TA stack 167. Then the Next Instruction Address which is generated by adder 107 and sent to the BHT on path 108 will compare equal with BA. Select unit 173 will issue this next instruction address on path 127 and cause the I-Buffer 119 to load the branch instruction (located at BA) into the Next Instruction register 123. When the Branch instruction moves from register 123 to the decode register 105, the select 173, under control of function 171, will issue TA on path 127 and cause the I-Buffer to load the branch target instruction into the Next Instruction register 23. Meanwhile the processor controls assume the branch to be taken (based on the BHT) and the Update IC register 117 is loaded with the target address from the Address Generate 111. Sequential instruction fetching will then proceed from the target address until another taken branch is encountered.

The actual target address from the Address Generate 111 also goes to the BHT on path 108 where it should be compared with the predicted target address TA from the BA/TA stack 167. This is done with compare unit 170. If the two addresses do not compare, a wrong TA signal is issued on path 172 and the actual TA replaces the predicted TA on path 168 going to the Correction Handling Stack 175 (FIG. 12).

The BHT may also err in predicting as taken a branch which turns out not to be taken or in failing to predict a branch which is taken. The latter error can occur when a branch changes its behavior or when a new branch is encountered.

The loading and correcting of the BHT is now described. The need to correct the BHT will usually be determined when the associated branch instruction reaches the Execute and Putaway function 113 (see FIG. 3). This may be several cycles after the branch was decoded and in the meantime other instructions, which may also be branches, have been decoded. The BA/TA information on the associated branch, as well as these possible other branches, will have been removed from the DATA STACK 167 as previously described. This information must be kept for a while in case a correction is necessary.

Figure 12:
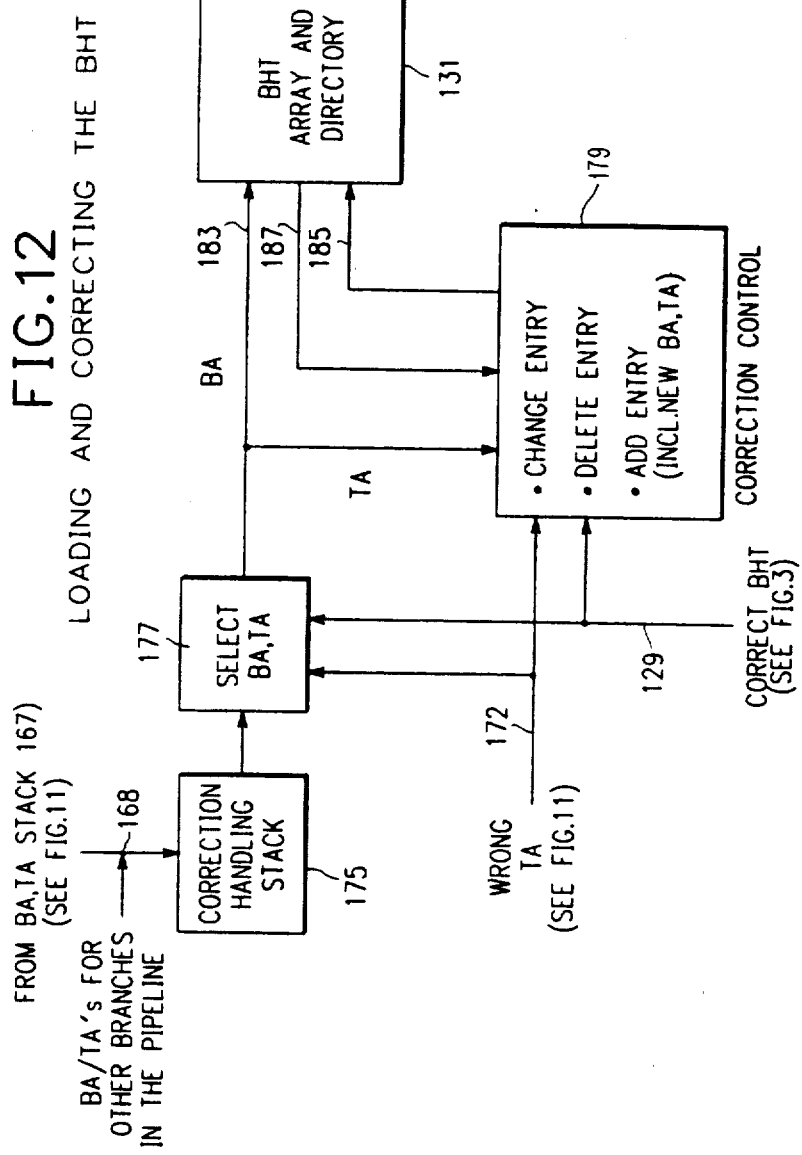
FIG. 12 is a block diagram of the loading and correcting mechanism of the BHT.

FIG. 12 shows a Correction Handling Stack 175 which receives the BA/TA pairs which have been removed from the BA/TA stack via path 168. As previously noted, if a wrong TA was detected, it is the correct TA that is put on path 168. Also entered into the correction stack is the BA/TA information for other branches, i.e., those not predicted as taken by the BHT. This ensures that there are entries in the correction stack for all branches that are in some stage of the processor pipeline between the decode register 105 and the Endop function 115 (see FIG. 3). If a branch has been correctly predicted by the BHT, either taken or not taken, the branch will proceed to Endop and its entry in the correction stack will be removed. However, if a BHT error has been detected at some point in the pipeline the information needed to correct the BHT is in the correction stack.

The correction process is shown in FIG. 12. The need for correction can be detected at two points in the execution of a branch. A wrong target address (TA) will be detected early, after the branch target address has been generated by the Address Generate function 111 (FIG. 3). The wrong TA signal appears on path 172 and does two things. First, it causes the select unit 177 to select the appropriate BA/TA pair from the Correction Handling Stack 175. The BA portion is used to access the BHT array and directory 131 for the entry to be changed. Second, it causes the correction control 179 to insert the correct TA in the entry and store the entry back into the same location in the BHT array.

A take/not take prediction error will be detected later since it usually depends on completion of the instruction previous to the branch. This error will be signalled on path 129 and causes the same actions as the wrong TA signal but with some differences. If the error was to predict as taken a branch which in fact was not taken, then the corresponding sub-entry in the BHT is deleted (i.e., its valid bit is turned to not valid). If the error was failing to predict a taken branch, then a new sub-entry must be added to the BHT. This new sub-entry may belong in an existing entry or it may belong in a new entry (refer to the discussion relative to FIG. 7). If it belongs in an existing entry, it is entered into an empty sub-entry if one exists or else the least recently used sub-entry is displaced to make room for it. If it belongs in a new entry, the new entry either goes into an empty array position or else the least recently used entry is displaced to make room for it.

Why a Pageable Branch History Table (PBHT) offers advantages over a standard BHT is now discussed. The overall concept and operation of the PBHT follows in a detailed description of operation.

To be effective a BHT should correctly predict most of the taken branches. This level of accuracy requires a table with at least 1000 entries which would physically be of appreciable size. As can be seen from the preceding descriptions, the BHT is directly involved in the speed-critical part of the processor, a region which should be kept as compact as possible to reduce signalling delays. One advantage of the PBHT is that it does the work of the BHT but requires relatively little hardware placed in the speed-critical area. A second advantage, related to the first, is that the effective size of the PBHT can be made as large as needed without intruding into the speed-critical area.

There is a conceptual resemblance between the PBHT and a cache but there are also important differences. It will be helpful to further discuss these resemblances and differences. A cache is used when main memory cannot be fast enough to support the desired processor speed. The cache can be faster than main memory because it is much smaller and because it can be built with faster technology. The cache can hold only a small part of the contents of main memory (say 64K bytes out of several million bytes) but is able to supply a surprisingly large fraction of processor requests to memory. There is also a small, but never zero, probability that a requested item will not be in the cache, an event called a "miss". In present cache designs these misses are not anticipated, they are known only when the processor's demand for an item elicits the miss. Therefore, new items are brought into a cache only on demand from the processor, and the processor is usually delayed waiting for the item to return from main memory.

The PBHT consists of a small memory holding a limited amount of branch information backed up by a large reservoir of branch information equal to or larger than a standard BHT. The small memory, which hereafter is called the Active Area, contains information on all branches which the processor can reach from its present point of execution in the program. These reachable branches are a very small fraction of the branches which would be in a standard BHT, which is why the active area can be small. Only the active area needs to be placed in the speed-critical region of the processor, the backup reservoir can be elsewhere. In this sense the active area resembles a cache and the backup reservoir resembles main memory.

Figure 13:
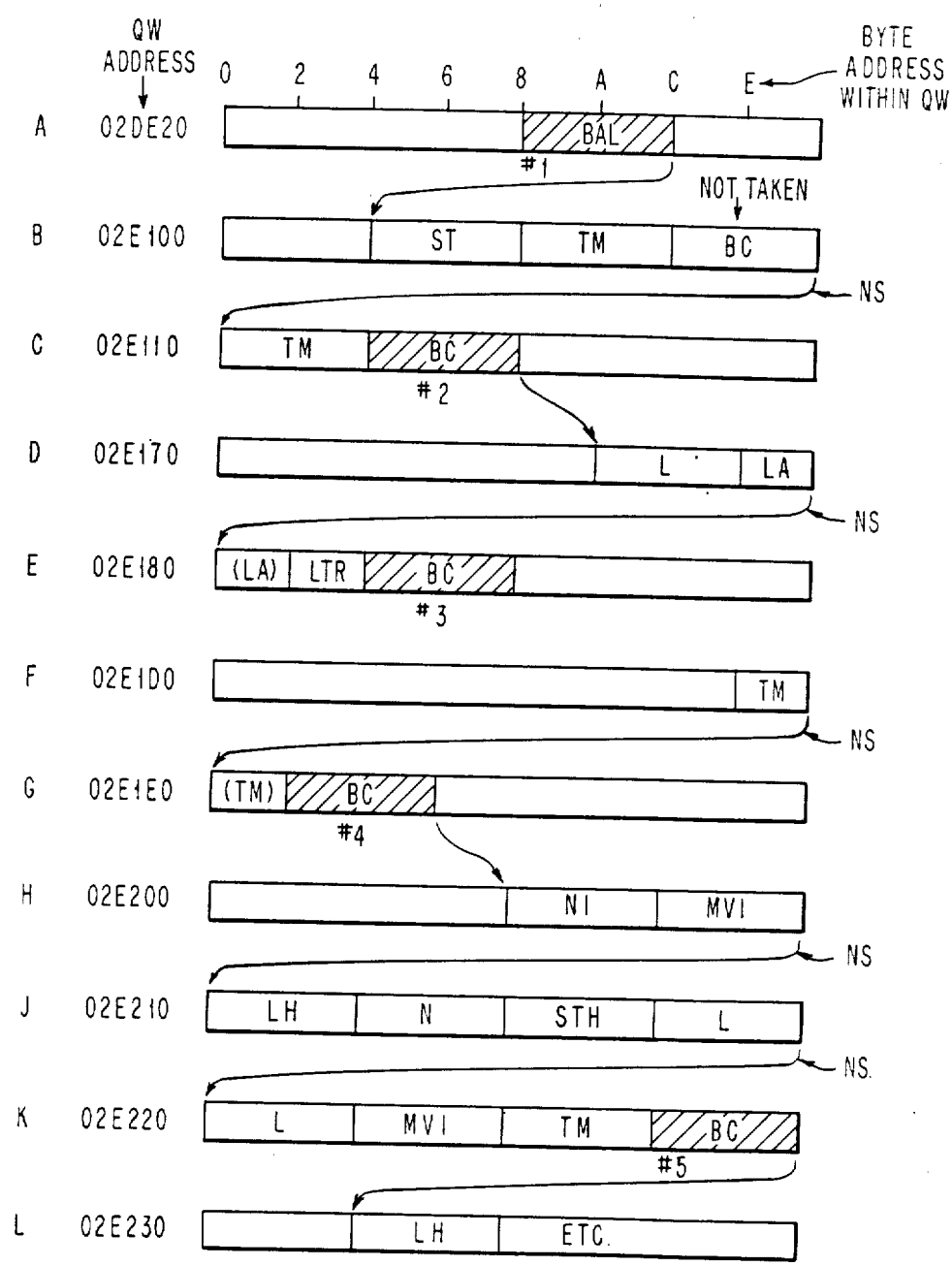
FIG. 13 is a diagram of the quadword sequence of FIG. 5 highlighting the taken branches.

Unlike the cache, however, the active area is self-loading. The branch information in the PBHT is used continually to bring into the active area information on branches that become reachable as the processor proceeds through its program. An example follows which shows what is done. Refer now to FIG. 13 which shows the QW (block) sequence for the sample program excerpt previously discussed in connection with FIG. 5. Suppose the processor is currently executing the BAL instruction in the top block. The next four branches which are reachable from this point are shown shaded. There may be many other branches elsewhere in the program but only these are immediately reachable. Therefore, even if the active area contains only information on the next several reachable branches it can still provide the same function as the full BHT previously described.

Two more useful examples can be drawn from FIG. 13. First, the step by step activity in an active area holding two blocks (Quadwords) is described. This is for illustration only, the active should really be somewhat larger. Second, it will be shown that the block is not necessarily the best size for an entry in the active area and the concept will be introduced for a segment consisting of several blocks as a preferred active area entry. FIG. 14 shows the successive contents of an active area for the program sequence of FIG. 13. Contents are shown at nine points in time. At the top of the figure is the contents of a two block active area as they would be when the processor is starting the program sequence at the top of FIG. 13. The first entry in the active area is for branch #1 (the BAL), this entry is located in the first (upper) block of FIG. 14. The entry shows the location (8) of branch #1 in the block and the target address (02E104). The second entry is a blank entry, which is subsequently explained, since there is a difference between the PBHT and the BHT previously described.

The BHT contains entries only for taken branches. If the BHT has no entry for a particular block it is assumed that the block contains no taken branches. The assumption will usually be correct, it will be possibly wrong only if the block is a new block (not previously encountered) or if a branch in the block changes its action from not-taken to taken.

The same assumption is made for the backup area of the PBHT and it could be made for the active area of the PBHT, but this would lead to an ambiguity which could complicate some of the control circuits for the active area. Remember that the active area contains only a very small portion of the contents of the backup area and therefore an entry may not be found in the active area simply because it has not yet been brought in from the backup area. If a block would also have no entry in the active area when it has no taken branches, one would not immediately know how to interpret finding no entry. It could mean that the block has no taken branches or it could mean that entry for the block has not yet been brought in from the backup area. This ambiguity is avoided by using blank entries in the active area. Whenever a reference to the backup area produces a "miss" a blank entry is returned to the active area, identified with the block address that produced the miss.

With this explanation, the meaning of the blank second entry at the top of FIG. 14 is that the block pointed to by the first entry (02E10) contains no taken branches. Therefore, all instructions in block (02E10) to the right of the entry point (see FIG. 13) will be executed and the next instructions will come from the next sequential block (02E11).

Figure 15:
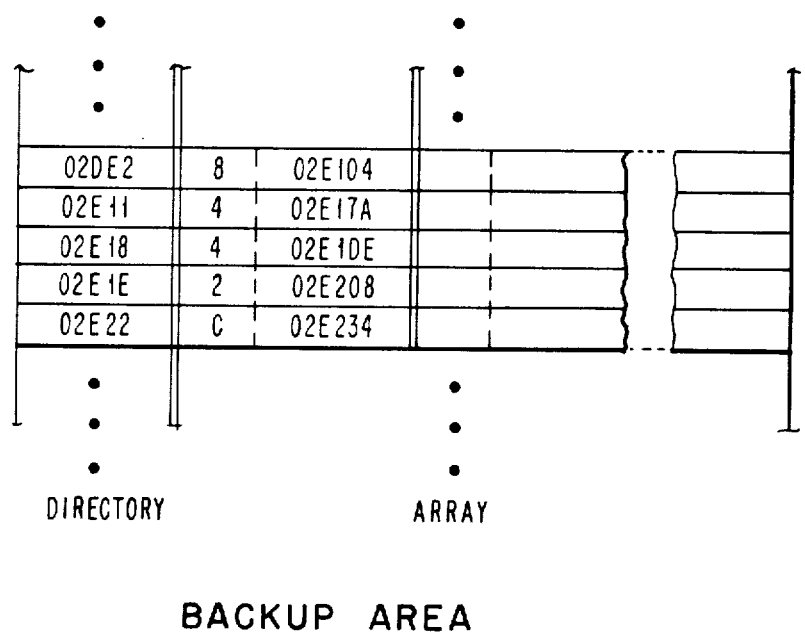
FIG. 15 is a diagram of the structure of the backup area to the active area of the system.

Returning to FIG. 14, when the processor has executed branch #1 (the BAL) there is no longer any need to keep the branch #1 entry (block 02DE2) in the active area; it will be removed, making room for a new entry. In order to select the new entry the PHBT controls use the target address (TA) of branch #1 and look in the active area directory to see if there is an entry for the target block (02E10). There is an entry but it is blank because there is no taken branch in that block. The controls then check the directory for the next sequential block (02E11) and find no entry (because the active area in this example has room for only two entries). The controls then look in the backup area and find an entry for block 02E11, this entry is brought into the active area as shown in the second frame from the top in FIG. 14. The backup area is shown in FIG. 15.

When the processor has executed the last instruction in block 02E10 the block entry is removed from the active area, making room for another new entry. The PBHT controls use the target address of branch #2 (in block 02E11) to access first the active area (no entry) and then the backup area (no entry). Assume that the target block 02E17 has no taken branches and return a blank entry to the active area as shown in the third frame.

Further deletions and entries into the active area proceed in the same way as described. If the active area contains more than two blocks, say N blocks, the procedure would continue until as many as N blocks have been filled. When the earliest branch with an entry in the active area has been executed by the processor its entry will be removed and a new one brought in, as above. In this way the active area will always contain entries for up to the next N (predicted) blocks that the processor will encounter.

In describing this example a design choice has been made that should be explained. Deleting a branch entry in the active area after the branch has been executed by the processor allows the opportunity to correct the entry, if necessary, while it is still in the active area. However, a different choice could have been made. Remember that the BHT is used primarily to preload the instruction buffer with the predicted sequence of instructions. Therefore, an entry could be deleted just after it is used for the prefetch, which would be well in advance of when the corresponding branch is executed by the processor. The advantage of such earlier deletion is to free up space in the active area sooner; the disadvantage is that the entry must be recalled if a correction is necessary.

The segment concept is now described. Thus far the concept of a block has been utilized. To review, a block is a group of consecutive bytes that is handled as a unit. For example, instructions are fetched from memory a block at a time, an instruction buffer typically holds from 4 to 16 blocks, and the BHT/PBHT has been described as based on blocks: entries are per-block and each sub-entry points to a successor block. However, the BHT/PBHT can be based on a larger or smaller group of bytes than the block.

Figure 16:
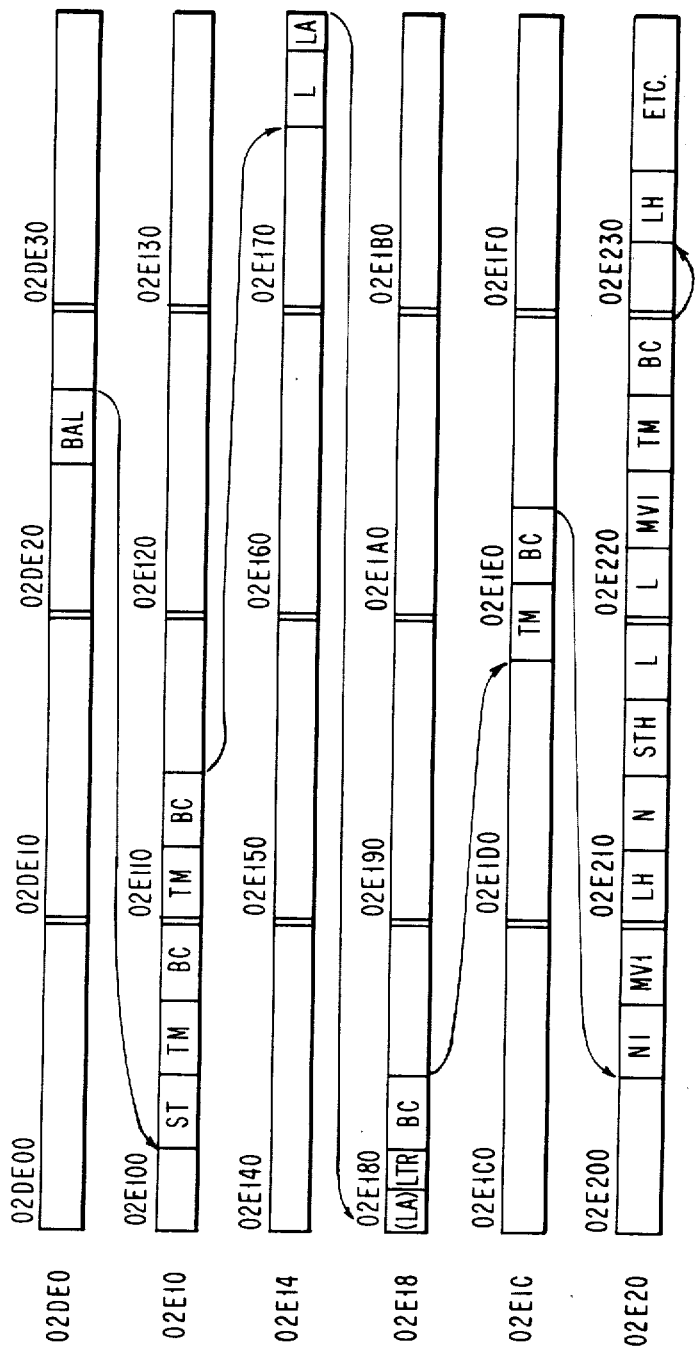
FIG. 16 is a diagram of the program sequence of FIG. 5 as it would appear in segments of 64 bytes (4 quadwords) each.

For the PBHT there are several advantages in basing entries on groups of bytes larger than a block. These larger groups are termed "segments". FIG. 16 shows the program sequence of FIG. 5 as it would appear in segments of 64 bytes each (4 Quadwords). Note that the 11 QW's of FIG. 5 now fit into 6 segments. On the segment basis fewer active area deletions and insertions are needed than with a QW (block) basis. This allows more time for the deletion/insertion process, which can be useful. The additional time accrues for two reasons: (1) that taken branches may find their targets within the segment and not require a new segment to be accessed and, (2) next sequential block prefetching within the segment is handled without reference to the backup area. More important, probably, is the opportunity for abbreviating some of the target addresses (TA's) in the PBHT sub-entries, thereby reducing the size of the active and backup areas. Note, for example, that the branch in the bottom segment of FIG. 16 has its target in the same segment and hence does not need a full address, five bits will suffice (plus one or two more bits to denote that the address is abbreviated). A little less obvious is another opportunity for abbreviation. Note that all other branches except the first have their targets in the next sequential segment, a fact which can be denoted by one additional bit, so here again a full address is not needed.

From this point forward it is assumed that PBHT entries are on a segment basis.

Segment Sequence and Segment crossings are now discussed. The concept of segment sequence is illustrated in FIG. 16. The sample program begins at the top in segment 02DE0. The program "crosses" from this segment into segment 02E10 after the BAL instruction. Similarly, the program crosses from segment 02E10 into segment 02E14 after the BC instruction, etc. In general, the instructions executed by a processor over any period of time can be represented as a sequence of segments containing the successive instructions being executed. If this sequence is known beforehand one could do a perfect job of prefetching segments into the Instruction Buffer and the processor would never lose time waiting for instructions to be fetched from memory.

Of course one cannot know the actual segment sequence beforehand but one can use the PBHT to predict the probable segment sequence. From extensive simulation it is known that the predicted sequence will be quite close to the actual sequence but there will be occasional errors. After an error and until it is corrected, further predictions will probably be useless. The probability of an error will increase as the prediction is carried further ahead in time, so there is a practical limit on how far prediction should be attempted ahead of execution.

Several components of the PBHT will now be discussed in some detail, beginning with the components that provide the branch prediction information to the processor. These function just as the previously described BHT and include the active area and the active area directory. The remaining components, which provide the self-loading of the active area so that it always has the relevant branch information, are then discussed.

Figure 17:
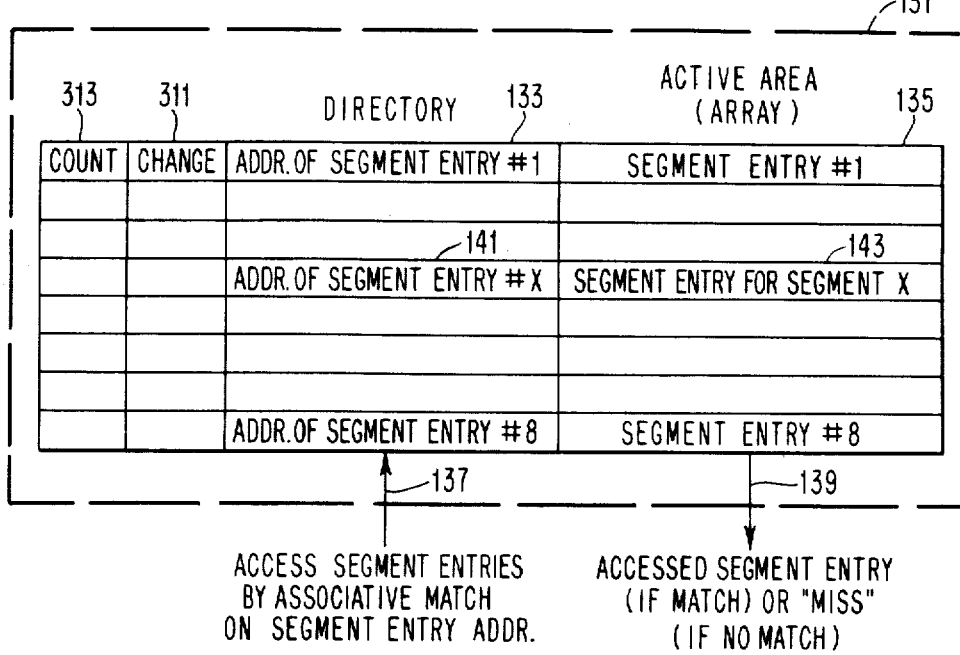
FIG. 17 is a diagram of the active area and the active area directory.

FIG. 17 shows the active area and the active area directory. From the standpoint of the processor this is equivalent to the BHT Directory and Array shown earlier in FIG. 6. However, there are two differences which should be emphasized once again. The BHT array is large, having at least 1000 entries and perhaps as many as 4000, while the active area is small: eight (8) entries are shown and simulation results support this as an adequate number. The other difference is that the active area and directory have entries for segments rather than blocks. This will not change the description already given for the BHT, it would affect the detailed design of some of the hardware in an obvious way and will not be further remarked.

Since the active area and the BHT are equivalent in the normal operation of the processor, the numbering of FIG. 6 is carried over to FIG. 17. The active area 135 contains 8 segment entries (for example) one or none of which will be read out when an access is made to the directory. Either outcome is presented on path 139 as shown. Because of the self-loading mechanism provided for the active area we expect a very high proportion of accesses to result in a successful access.

In FIG. 17 the active area directory 133 holds the segment address of each entry in the active area. For ease of explanation it is assumed that the directory performs an associative match against each access segment address. If a match is detected the corresponding array entry 135 is read out on path 139, otherwise a MISS is signalled. It is recognized that an actual implementation would probably use a set associative scheme as amply taught in the cache literature. Suppose that the access segment address supplied on path 137 is the address X. As shown there will be a match in the directory with address entry 141 resulting in a readout of array entry 143 on path 139.

Figure 18:
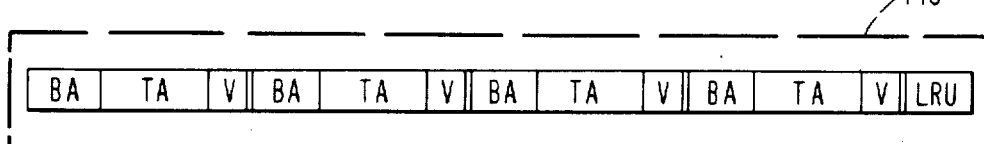
FIG. 18 is a diagram of the segment format for the array entry.

FIG. 18 shows the format for the array entry, which is now for a segment. Compare it to FIG. 7, there is no difference except that the segment concept has replaced the block. An allowance for up to four taken branch entries, now per segment instead of per block is shown. Simulation results show that four entries are in fact sufficient for a 64 byte segment. For a larger segment of 128 bytes, for example, eight entries might be required.

The selected segment entry 143 is passed over path 139 to the controls 149 (FIG. 9) and stored in a register 151. As previously described for the BHT and FIG. 10 the appropriate BA/TA is selected from the segment entry by the select gates 155. From this point on, the operation of the PBHT is exactly the same as previously described for the BHT and will not be repeated here. What remains is to describe the self-loading operations of the PBHT.

The self-loading of the PBHT are almost entirely independent of the BHT-like operations already described. For a perfectly predicting PBHT the only interaction needed is a signal to the self-loading controls that the processor execution activity has moved out of one segment into another. This signal is used by the self-loading controls to advance its predicted segment sequence by one more segment. Also, since prediction is not perfect, the self-loading controls must be signalled when a prediction error is detected, because the predicted sequence must be corrected after the point of a prediction error.

The self-loading operations is first described in a general way. There are three phases: the startup when no valid entries are in either the active or backup areas, the transitional when there are partial valid entries, and the equilibrium when most or all entries are valid and the branch prediction accuracy is at its best. We will first discuss the startup operations and then go to the equilibrium operations. The transitional operations will be a mixture of startup and equilibrium operations and should be understandable from the startup and equilibrium discussions.

Repeating, at startup there will be no valid entries in either the active area or the backup area. The the processor encounters the first taken branch after startup, and since there was no entry for it in the PBHT, it will signal a prediction error. As previously described, the segment address of this branch will be looked for in the active area and will not be found. Therefore, a new entry will be put into the active area with the "change bit" 311 set on (see FIG. 17). Since the processor has already executed this branch there is no need to keep its entry in the active area, so the changed entry is immediately copied into the backup area by the self-loading controls via paths 309 and 303, and the entry is deleted from the active area. Then, starting from the target of this branch, the self-loading controls will attempt to preload the active area with entries for the next several taken branches (of course no entries will be found immediately after the startup).

Figure 19:
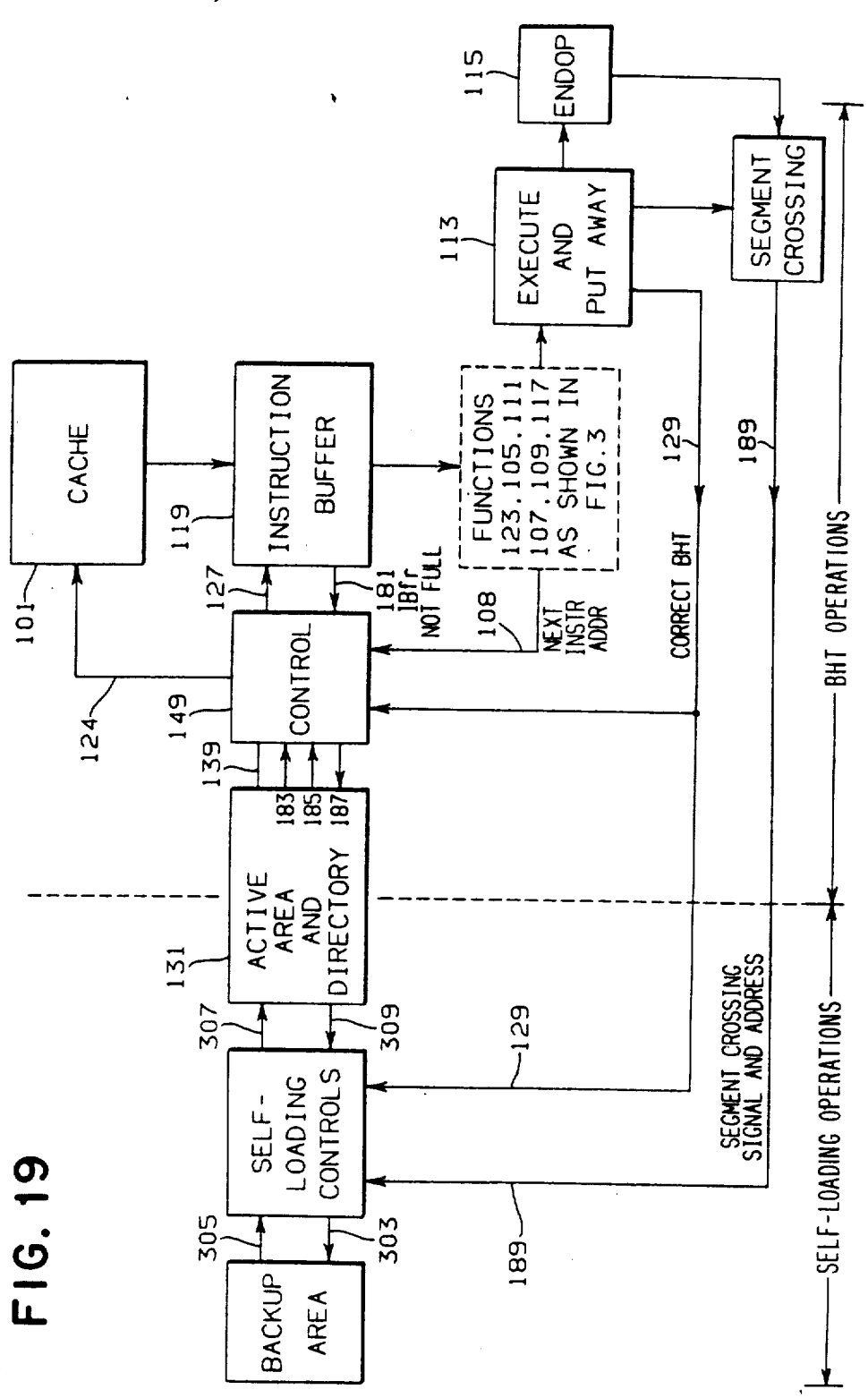
FIG. 19 is a block diagram of the system illustrating the self-loading BHT operations.

Referring to FIG. 19, the prediction error will be signalled on path 129, including the branch address (BA) and target address (TA) of the mispredicted branch. The self-loading controls will access the backup area with the TA segment address on path 303 and find no entry. (Since entries are made only for taken branches, finding no entry means either that the accessed segment had been seen before and it contained no taken branches or it means that the accessed segment has not been seen before. Nothing useful can be done with the second meaning so the first is always assumed. As previously explained, a miss in the backup area causes a blank segment to be returned to the active area. The controls then access the next sequential segment address (TA+1) and again find no entry. This will continue with TA+2, TA+3, etc., until another prediction error signal arrives on path 129, at which time the above repeats with the new TA.

The active area will soon be filled with mostly blank segments and these will be replaced with corrected segments as processor execution proceeds. At the processor continues to encounter new taken branches, entries are put into the backup area, and in this way the backup area will be filled to capacity. The active area will also fill as the self-loading controls begin to find entries in the backup area, these entries coming back on path 305 to the self-loading controls and then on path 307 to the active area. Loading of the active area will stop when the active area is full. It will resume whenever space becomes available, as discussed below.

Next described is the self-loading operations when the backup area is in equilibrium, i.e., fully loaded. At that time the active area will also be loaded. First, Consider the case in which there are no prediction errors. The activity should be quite simple: when the processor executes a branch and no correction is needed, the corresponding entry in the active area is deleted, allowing room for the self-loading controls to fetch from the backup area one more entry in the predicted segment sequence. The actual activity is not quite so simple because there may be looping in the program so that given segments may be re-entered within a short interval. For example, consider segments A, B, C, etc. The program being followed by the processor may involve the sequence ABCABCABCDEF . . . The active area (of 8 segments) could be filled with the segments A B C A B C A B which would correctly reflect the predicted sequence but this would have two disadvantages. First, space in the active area would be wasted storing extra copies of the same segment and, second, any corrections required to a segment would have to be made to all copies.

A design is preferred which allows only one copy of a segment in the active area. To allow for the above re-use of segments a count field is introduced in the directory entries for the active area. In FIG. 17 this count field 313 starts at zero for the first entry of a segment and each time that the self-loading controls predict re-entry of this segment the count field is advanced by one. With this design the deletion of active area entries is as follows. When the processor executes a branch and no correction is needed, the corresponding entry in the active are will have its count field reduced by one. If the result is negative (less than zero) the entry will be deleted, otherwise it will not be deleted.

When an entry must be corrected its count field is ignored, the entry is corrected, copied to the backup area, and then deleted. All other entries in the active area at least have their count fields reset to zero, more likely they will be marked invalid. In either case the self-loading controls will refill or reconfirm the active area starting from the target of the corrected branch.

The self-loading controls were described above in an overall way in order to show the overall action. In doing a knowledge of which segments should be loaded into the active area was assumed. How this knowledge is derived by the Analyzer and used by the Stager to control the loading of the active area is set forth below.

The reason for having an analyzer can be seen first by referring back to FIG. 16 which shows the segments of the sample program. Note that there are taken branches in these segments that sometimes point to a different segment (e.g., the BAL in the top segment 02DE0 points to starting address 02E104 in segment 02E10) and sometimes point to the same segment (e.g., the BC in the bottom segment 02E20 which points to address 02E234 in the same segment). Also, a segment may have no taken branch after the point at which it is entered, in which case the next segment will be the next sequential segment (e.g., the third segment from the top 02E14 after which follows the next sequential segment 02E18).

Figures 20, 21:
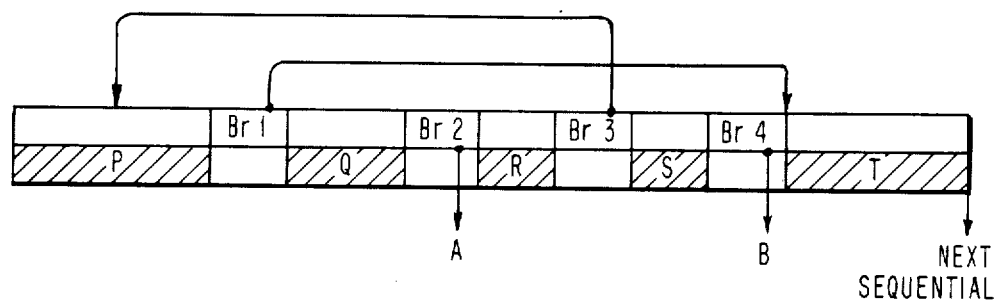
FIG. 20 is a diagram illustrating the branch action within a segment.
FIG. 21 is a diagram of a segment entry/segment exit table.

As can be seen from these examples, the sequence of segments is predictable but not without some analysis of each successive segment. The basic problem is to look at each segment, starting at the entry point into the segment, and determine the net effect of all taken branches which are in the segment after the entry point. This will not usually be very complicated, as can be seen in the example of FIG. 16. However, all the possibilities which may occur must be provided for. FIG. 20 shows a possible segment which contains four taken branches, two of which have targets within the same segment and two of which have targets in different segments A and B respectively.

Note that in this figure, as in all of the figures, execution of instructions proceeds from left to right. The upper part of the figure shows the location of four taken branches and the arrows from each branch indicate the target of the branch. As stated before two of the branches have targets within the segment: Branch #1 has its target forward in the segment, Branch #3 has its target backward in the segment. Branch #2 has an external target segment A, and Branch #4 has an external target segment B.

The lower part of the figure shows five regions P,Q,R,S, and T into which the entry address to this segment could lie. These regions are now examined.

If entry is into region P, Branch #1 goes to region T which exits to the next sequential segment.

If entry is into region Q, Branch #2 exits to segment A.

If entry is into region R, Branch #3 goes back to region P, then Branch #1 goes to region T, which exits to the next sequential segment.

If entry is into region S, Branch #4 exits to segment B.

If entry is into region T, exit is to the next sequential segment.

These outcomes are summarized in the segment entry/segment exit table for this segment as shown in FIG. 21.

From FIG. 20 it can be seen that the entry regions can be identified in terms of the entry addresses. Specifically:

Region P if entry address is less than or equal to BA1 (address of branch #1). Note that the addresses are within and relative to the segment, and not the full memory addresses.

Region Q if entry address is greater than BA1 and less than or equal to BA2.

Region R if entry address is greater than BA2 and less than or equal to BA3.

Region S if entry address is greater than BA3 and less than or equal to BA4.

Region T if entry address is greater than BA4.

Figure 22:
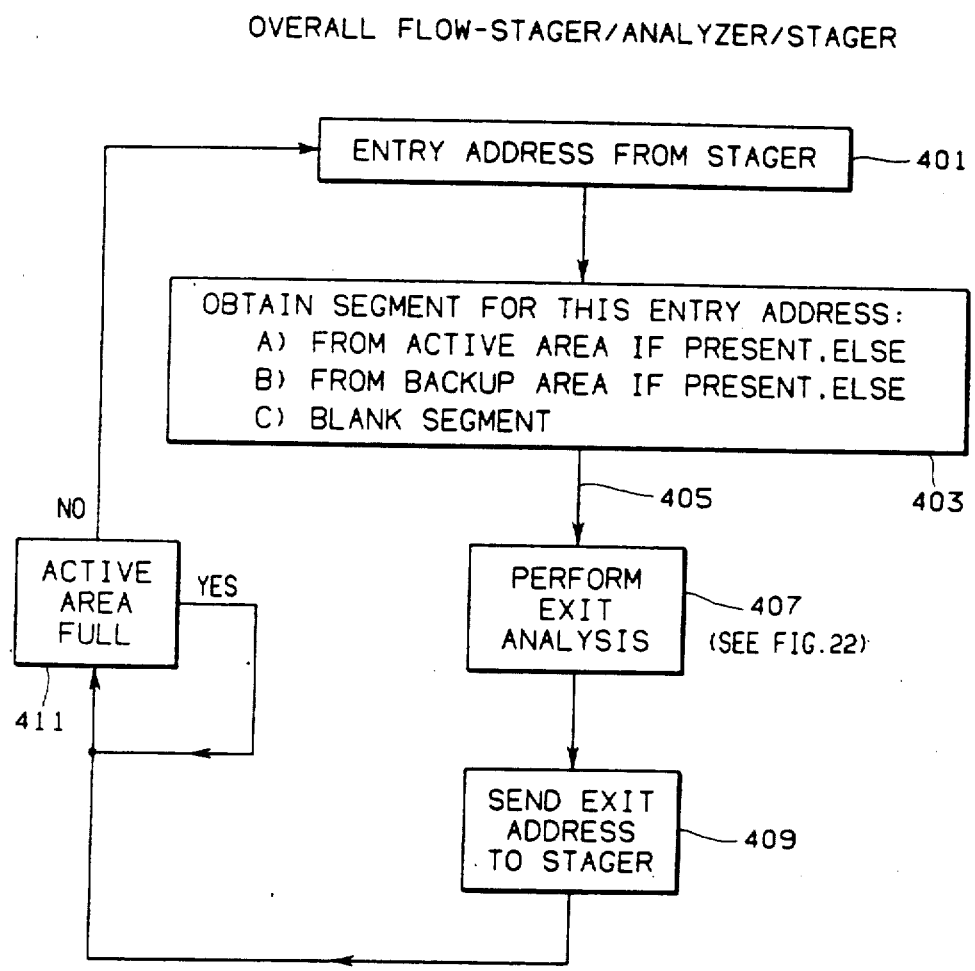
FIG. 22 is a flow chart of the stager/analyzer/stager.

The taken branch addresses are, of course, available from the segment entry (see FIG. 18) and the entry address is the exit address from the previous segment. The job of the analyzer is to compute the exit address for each successive segment based on the entry address to that segment, using the rules and information described above. The job of the stager is to keep the active area filled with the predicted sequence of segment entries, based on the work of the analyzer. This overall flow is shown in FIG. 22.

Figure 24:
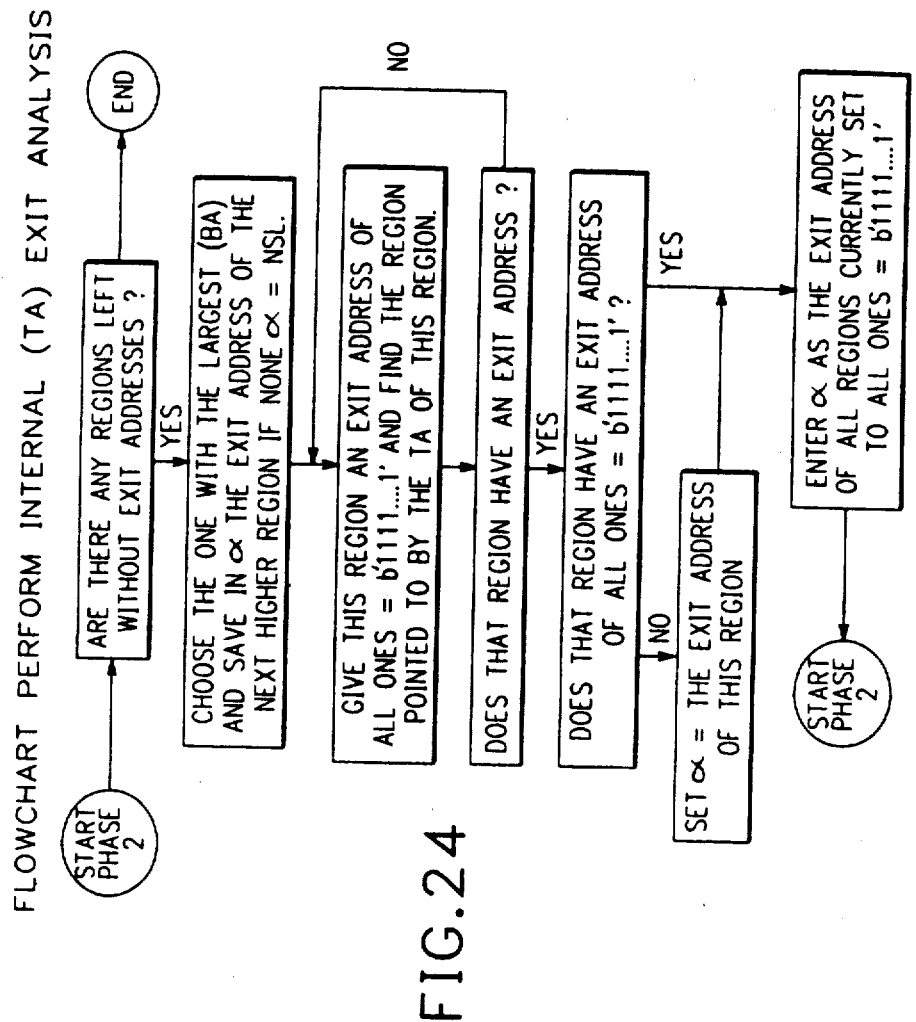

A flow chart of the Analyzer is given in FIGS. 23 and 24. Exit analysis for a new segment begins with identifying the regions. These are delimited by the taken branches within the segment. For example, in FIG. 20, BR #1 delimits segment P, BR #2 delimits segment Q, etc. The final segment T is delimited by the end of segment.

The branch which delimits a region will determine the ultimate exit address for that region. When the branch has an external target address (i.e., to another segment), this external target address can be immediately assigned as the exit address for the region. This assignment is done in Phase 1 of the exit analysis.

When the branch has an internal target address (i.e., within the segment) the ultimate exit address is not immediately obvious and must be traced from region to region until a region is entered which has an external exit address as assigned in Phase 1. Such regions with external exit addresses in FIG. 20 are Q, S, and T. This tracing is done in Phase 2 of the exit analysis. Note that as the analysis proceeds the exit address of a given region goes through three stages:

1. No exit address
2. Exit address in process (denoted by all ones)
3. Ultimate exit address The ultimate exit addresses will be external, including addresses to the next sequential segment, except for the possibility of a branch loop that cycles within the segment. Such a loop will finally exit as a result of some change in branch action; this change can be predicted but it is not essential to do so. The alternative is to accept a prediction error.

As previously mentioned, the job of the stager is to keep the active area filled with the predicted sequence of segment entries, based on the work of the analyzer. The aim is to have the active area always containing segments which the processor is using or will use in the future. The stager will bring in new segments only when there is space in the active area, and space becomes available only as the processor finishes activity within a segment and its entry can be deleted. Thus, the stager will be working many segments ahead of the processor but not indefinitely far ahead. For an active area of 8 segments, the stager can be 7 segments ahead of the processor or perhaps a few more if some of the 8 segments are re-entered, as shown by the associated count values 313 FIG. 19.

The action of the stager is shown by the elements 409, 411, 401, 403, and 405 in FIG. 22. The decision element 411 holds up the stager if the active area is full. Otherwise the exit address 409 from the analyzer is used by the stager as an entry address 401 with which to obtain the next segment for analysis 403. The next segment may or may not be already present in the active area. If it is present it is fetched and sent to the analyzer for analysis or, if it is already analyzed, its exit address is sent to the stager, etc. If it is not present, it is fetched from the backup area and sent both to the analyzer and the active area. If it is not present in the backup area, a blank segment will be returned to the active area and further analysis must wait until the processor reaches the blank segment and determines its exit address.

INDUSTRIAL APPLICABILITY

It is an object of the invention to provide an improved branch history table.

It is another object of the invention to provide an improved pageable branch history table.

It is yet another object of the invention to provide an improved pageable branch history table which is divided into an active high speed section for processing branch instructions in one of n memory segments, and a slow speed section in which are stored the remaining entries. The active area is constantly updated from the slow speed section based on following instruction segments containing branch instructions that are anticipated for future use.

Having thus described our invention, what we claim as new, and desire to secure by Letters Patent is:

1. In a branch history table which is divided into two sections, with groups of instructions being divided into segments and with the branch information for a segment forming a segment entry, the combination comprising:
   an active high speed section in which n, where n is an integer, segment entries are stored, including means for processing branch information in said segment entries;
   a slower speed backup section which stores the remaining segment entries of said branch history table; and
   means for updating the active high speed section from the slower speed section based on analyzing branch information in segment entries to determine entries to be used in the future.

2. The combination claimed in claim 1, wherein said means for updating comprises:
   analyzing means for determining exit address of each branch instruction in a given segment entry; and
   staging means responsive to the exit address determination of said analyzing means for examining the exit addresses of each segment in said active high speed section to determine which are target addresses of following segment entries in said slow speed section, including means for readying said following segment entries for fetching to said active high speed section.

3. In a branch history table which is divided into two sections, with said branch history table viewing memory as being divided into segments, wherein a segment is a continuous portion of memory, the combination comprising:
   a first active high speed section in which n, where n is an integer, segment entries are stored, including means for processing branch information in said n segment entries;
   a second slower speed section in which the remaining segment entries in said branch history table are stored;
   analyzer means coupled to said first active high speed section and said second slower speed section for determining an exit address of each branch instruction in a given segment; and
   stager means coupled to said first active high speed section and said second slower speed section and responsive to the exit address determination of said analyzer means for assuring the next n−1) segment crossing will be to segment entries stored in said first active high speed section.

4. A method of processing branch instructions in a branch history table, wherein memory is viewed as being divided into segments, wherein a segment is defined as a continuous portion of memory which starts on a segment boundary, said method comprising the steps of:
   processing n, where n is an integer, segment entries in an active high speed section of said branch history table;
   storing the remaining segment entries in said branch history table in a slow speed section; and
   updating the active high speed section from the slow speed section based on analyzing the segment entries to determine if branch information contained in the segment entries are anticipated for future use.

5. The method of claim 4, wherein the step of updating includes the steps of:
   analyzing the segment entries to determine the exit address of each branch instruction contained therein; and
   staging segment entries presently stored in said slow speed section, for storage in said active high speed section based on the exit address determination during the analyzing step.

6. A method of processing branch instructions in a branch history table, wherein memory is viewed as being divided into segments, wherein a segment is defined as a continuous portion of memory which starts on a segment boundary, said method comprising the steps of:
   processing n, where n is an integer, segment entries in a first active high speed section of said branch history table;

storing the remaining segment entries in said branch history table in a slow speed section of said branch history table;

analyzing each branch instruction in a segment entry by an analyzer to determine the exit addresses of the branch instructions; and responding to the determination of the exit addresses of the branch instructions in the respective segment entries by a stager, to assure the next (n−1) segment crossings will be to segment entries stored in said active area.

7. The method of claim 6, wherein said step of responding includes the steps of:

maintaining in said stager a first list of segment entries presently stored in said active area and a second list of the next (n−1) segment crossings;

comparing said first and second lists to determine if said (n−1) segment crossings are in one of the n segment entries presently stored in said first active high speed section; and fetching any segment entry that includes one of said (n−1) crossings and is not presently stored in said active high speed area, to said active high speed area.

* * * * *